United States Patent
Lee et al.

(10) Patent No.: US 10,990,162 B2
(45) Date of Patent: Apr. 27, 2021

(54) SCENE-BASED SENSOR NETWORKS

(71) Applicant: Scenera, Inc., Palo Alto, CA (US)

(72) Inventors: David D. Lee, Palo Alto, CA (US);
Andrew Augustine Wajs, Haarlem (NL); Seungoh Ryu, Newton, MA (US); Chien Lim, San Jose, CA (US)

(73) Assignee: Scenera, Inc., Palo Alto, CA (US)

( * ) Notice: Subject to any disclaimer, the term of this patent is extended or adjusted under 35 U.S.C. 154(b) by 0 days.

(21) Appl. No.: 16/660,391

(22) Filed: Oct. 22, 2019

(65) Prior Publication Data

US 2020/0050255 A1 Feb. 13, 2020

Related U.S. Application Data

(63) Continuation of application No. 15/469,380, filed on Mar. 24, 2017, now Pat. No. 10,509,459.

(Continued)

(51) Int. Cl.
*H04N 5/232* (2006.01)
*G06F 3/00* (2006.01)
(Continued)

(52) U.S. Cl.
CPC .......... *G06F 3/005* (2013.01); *G06F 11/3089* (2013.01); *H04N 5/23222* (2013.01);
(Continued)

(58) Field of Classification Search
CPC . G06F 3/005; G06F 11/3089; H04N 5/23245; H04N 7/183
See application file for complete search history.

(56) References Cited

U.S. PATENT DOCUMENTS 6,031,573 A  2/2000  MacCormack et al.
6,628,339 B1 9/2003  Ferland et al.
(Continued)

FOREIGN PATENT DOCUMENTS

WO  WO 2016/044778 A1  3/2016

OTHER PUBLICATIONS

Application Programming Interface, Wikipedia.org, Last edited Oct. 20, 2017, 9 pages, [Online] [Retrieved on Oct. 24, 2017] Retrieved from the Internet at<URL: https://en .wikipedia.org/wiki/ Application orogrammina interface>.
(Continued)

*Primary Examiner* — Mekonnen D Dagnew
(74) *Attorney, Agent, or Firm* — Fenwick & West LLP

(57) ABSTRACT

An approach to sensor data is based on scenes. One aspect concerns a computer-implemented method for specifying and obtaining a variety of sensor data and processed sensor data related to a scene. The method incorporates a Scene-based API that uses SceneModes and SceneData. An application requesting sensor data communicates a SceneMode to a group of one or more sensor devices and/or sensor modules via the Scene-based API. The SceneMode determines the SceneData to be captured or provided by the sensor group, which typically includes different types of sensor data related to the Scene and also further processed or analyzed data. The application receives the SceneData from the sensor group via the Scene-based API, with the SceneData organized into SceneShots which are samples of the Scene.

20 Claims, 21 Drawing Sheets
(12 of 21 Drawing Sheet(s) Filed in Color)

Related U.S. Application Data

(60) Provisional application No. 62/338,948, filed on May 19, 2016, provisional application No. 62/382,733, filed on Sep. 1, 2016.

(51) Int. Cl.
  H04N 5/247 (2006.01)
  H04N 7/18 (2006.01)
  G06F 11/30 (2006.01)

(52) U.S. Cl.
  CPC ......... *H04N 5/23245* (2013.01); *H04N 5/247* (2013.01); *H04N 7/18* (2013.01); *H04N 7/183* (2013.01)

(56) References Cited

U.S. PATENT DOCUMENTS

| | | | |
|---|---|---|---|
| 8,085,309 B1 * | 12/2011 | Kelliher | G01S 19/19 348/211.2 |
| 8,560,785 B1 | 10/2013 | Malhotra et al. | |
| 8,970,654 B1 | 3/2015 | Johnson et al. | |
| 9,225,889 B1 | 12/2015 | Korkin | |
| 10,630,874 B2 * | 4/2020 | Freeman | H04N 5/23203 |
| 2001/0043271 A1 | 11/2001 | Kawano | |
| 2004/0048507 A1 | 3/2004 | Hage | |
| 2005/0132385 A1 | 6/2005 | Bourges Sevenier | |
| 2006/0055819 A1 | 3/2006 | Pokrovsky et al. | |
| 2006/0187338 A1 | 8/2006 | May et al. | |
| 2007/0195182 A1 | 8/2007 | Ito | |
| 2008/0074540 A1 | 3/2008 | Liu | |
| 2008/0211941 A1 | 9/2008 | Deever et al. | |
| 2010/0025097 A1 | 2/2010 | Kojima et al. | |
| 2010/0321528 A1 | 12/2010 | Yu et al. | |
| 2011/0199497 A1 | 8/2011 | Motta | |
| 2011/0211215 A1 | 9/2011 | Yamamoto | |
| 2011/0234807 A1 | 9/2011 | Jones et al. | |
| 2011/0242317 A1 | 10/2011 | Wengrovitz | |
| 2012/0162366 A1 | 6/2012 | Ninan et al. | |
| 2012/0258658 A1 | 10/2012 | Matsuo | |
| 2012/0275640 A1 | 11/2012 | Widzinski et al. | |
| 2012/0294583 A1 | 11/2012 | Kosaka et al. | |
| 2013/0057713 A1 | 3/2013 | Khawand | |
| 2013/0176458 A1 | 7/2013 | Van Dalen et al. | |
| 2013/0272627 A1 | 10/2013 | Chen et al. | |
| 2013/0308036 A1 | 11/2013 | Peng | |
| 2014/0022399 A1 | 1/2014 | Rashid | |
| 2014/0139643 A1 | 5/2014 | Högasten et al. | |
| 2014/0306010 A1 | 10/2014 | Prokop | |
| 2015/0146037 A1 | 5/2015 | Keelan | |
| 2015/0227797 A1 | 8/2015 | Ko et al. | |
| 2015/0244943 A1 | 8/2015 | Brown | |
| 2015/0256623 A1 | 9/2015 | Ryhorchuk et al. | |
| 2015/0334285 A1 | 11/2015 | Zhang et al. | |
| 2015/0350711 A1 | 12/2015 | Guzik | |
| 2016/0006920 A1 | 1/2016 | Gomes Da Motta et al. | |
| 2016/0044227 A1 | 2/2016 | Johnson et al. | |
| 2016/0056964 A1 | 2/2016 | Andiappan et al. | |
| 2016/0063036 A1 | 3/2016 | Kawai | |
| 2016/0112630 A1 | 4/2016 | Kanumuri et al. | |
| 2016/0134932 A1 | 5/2016 | Karp et al. | |
| 2017/0093852 A1 | 3/2017 | Khosravi et al. | |
| 2017/0180386 A1 * | 6/2017 | Dewan | H04L 63/0428 |

OTHER PUBLICATIONS

Encryption, Wikipedia.org, Last edited Oct. 3, 2017, 5 pages, [Online] [Retrieved on Oct. 24, 2017] Retrieved from the Internet at <https://en.wikipedia.org/wiki/Encryption>.

PCT International Search Report and Written Opinion, PCT Application No. PCT/US17/32267, dated Jul. 31, 2017, 28 pages.

PCT International Search Report and Written Opinion, PCT Application No. PCT/US17/32268, dated Sep. 15, 2017, 22 pages.

PCT International Search Report and Written Opinion, PCT Application No. PCT/US17/32269, dated Sep. 14, 2017, 24 pages.

PCT International Search Report and Written Opinion, PCT Application No. PCT/US17/48383, dated Dec. 22, 2017, 18 pages.

PCT Invitation to Pay Additional Fees, PCT Application No. PCT/US17/32268, dated Jul. 18, 2017, 2 pages.

PCT Invitation to Pay Additional Fees, PCT Application No. PCT/US17/48383, dated Oct. 18, 2017, 2 pages.

U.S. Appl. No. 15/487,416, filed Apr. 13, 2017, Inventors: David D. Lee et al.

United States Office Action, U.S. Appl. No. 15/469,380, dated Oct. 19, 2018, 25 pages.

United States Office Action, U.S. Appl. No. 15/469,380, dated May 5, 2017, 15 pages.

United States Office Action, U.S. Appl. No. 15/469,380, dated Oct. 30, 2017, 18 pages.

* cited by examiner

Application: Home Surveillance

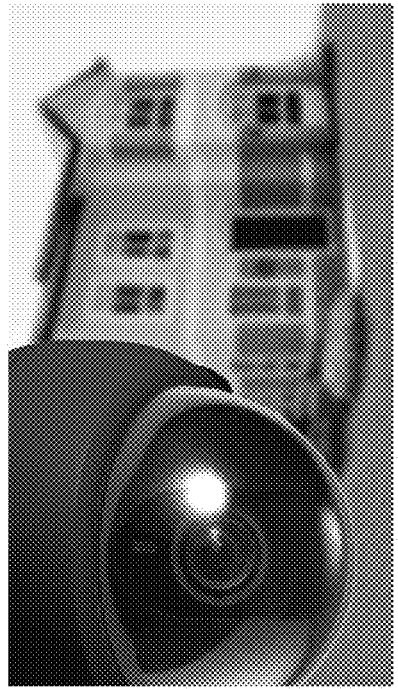

Scene Mode: #1

Camera Capabilities:

[Exposure] · [Gain] · [RGB] · [IR] · [Audio]
Iris/Aperture · Pan/Tilt/Zoom · Flash · Temperature
Depth · [Optical Flow] · [Face Recognition] · [Object Recognition]
Emotion Recognition · Sound Recognition · [P2P] · SNS Scene Data
Audio:

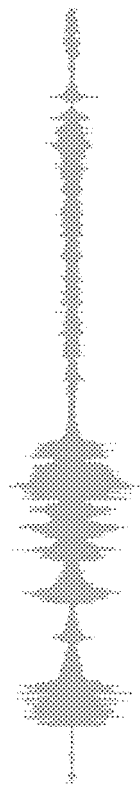

Video Frames:

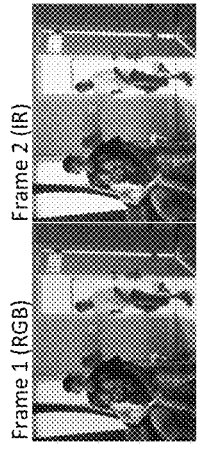

Frame 1 (RGB)   Frame 2 (IR)

Tagged Metadata:
Optical Flow: Motion detected
Object Recognition: 2 Human detected
Face Recognition: Unknown person

Triggered Action:
Sound the Alarm and notify home owner

FIG. 5

Application: Airport Surveillance

Scene Mode: #3

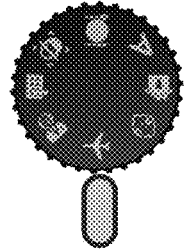

Camera Capabilities:

Exposure • Gain • RGB • IR • Audio
Iris/Aperture • Pan/Tilt/Zoom • Flash • Temperature
Depth • Optical Flow • Face Recognition • Object Recognition
Emotion Recognition • Sound Recognition • P2P • SNS

Scene Data:
Audio:

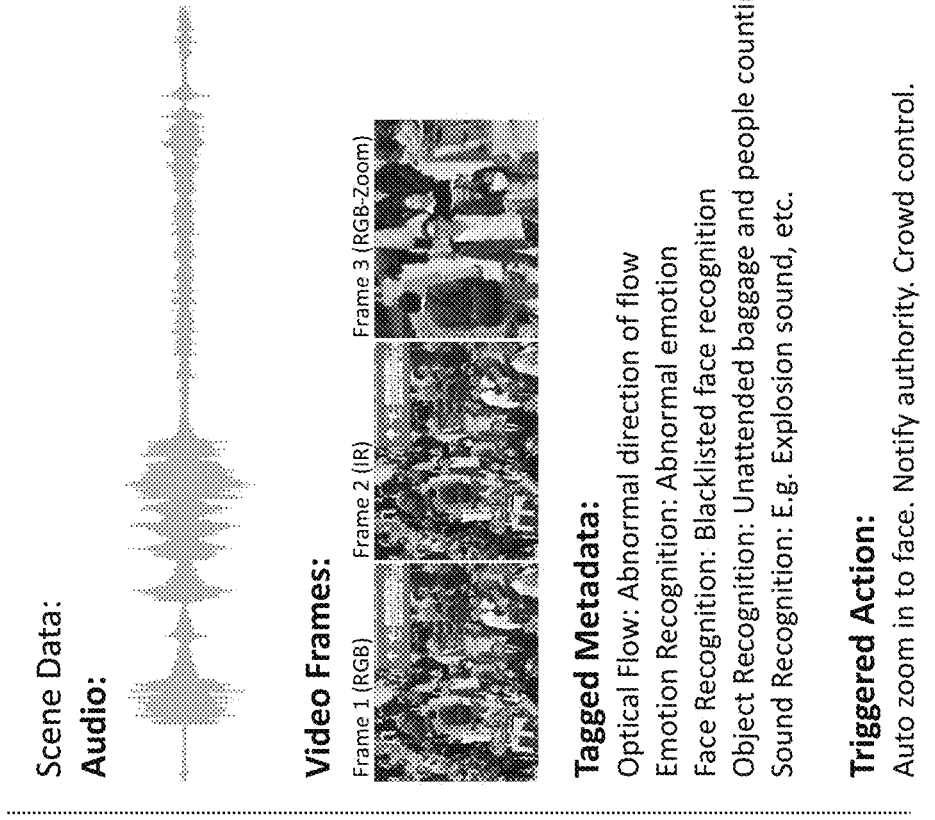

Video Frames:
Frame 1 (RGB)   Frame 2 (IR)   Frame 3 (RGB-Zoom)

Tagged Metadata:
Optical Flow: Abnormal direction of flow
Emotion Recognition: Abnormal emotion
Face Recognition: Blacklisted face recognition
Object Recognition: Unattended baggage and people counting
Sound Recognition: E.g. Explosion sound, etc.

Triggered Action:
Auto zoom in to face. Notify authority. Crowd control.

FIG. 7

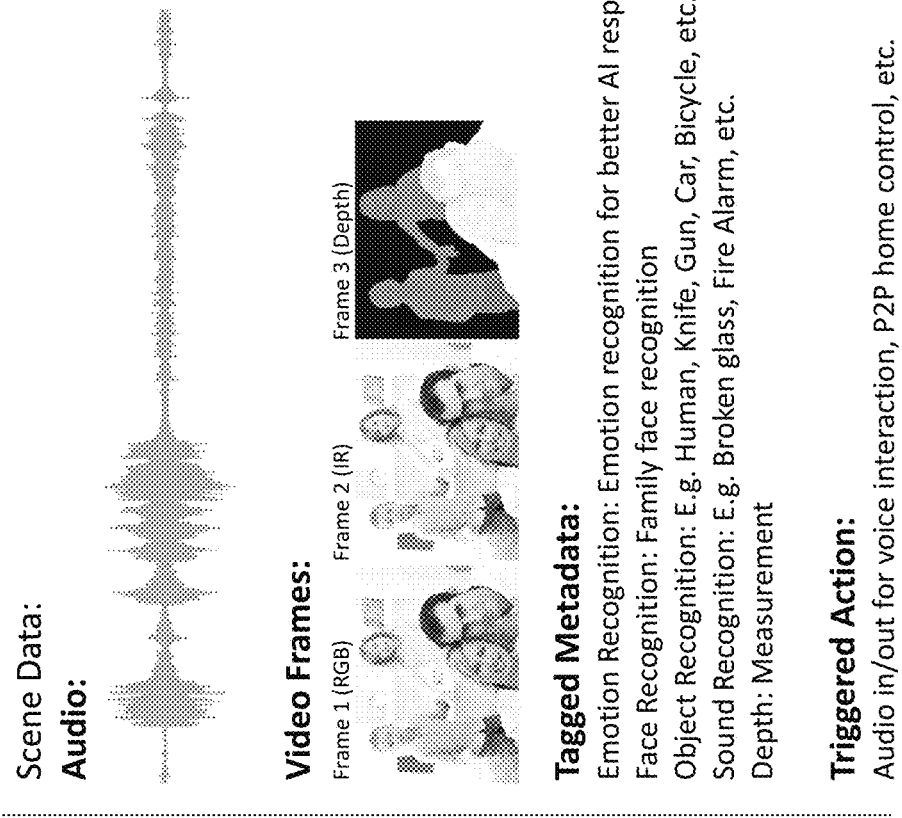
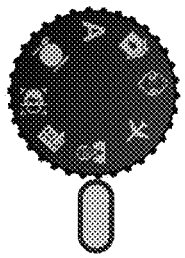
FIG. 8

Application: Connected Doorbell

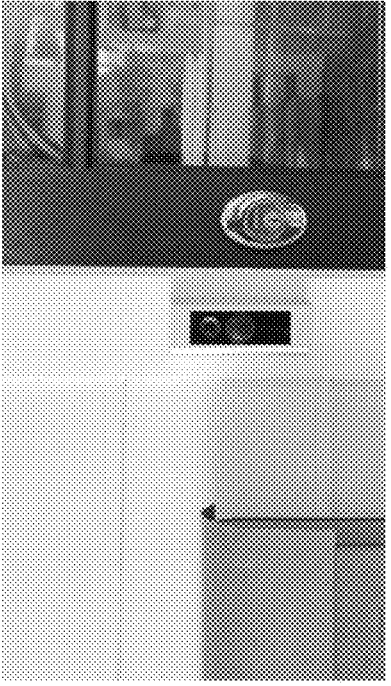

Scene Mode: #5

Camera Capabilities:

Exposure • Gain • RGB • IR • Audio
Iris/Aperture • Pan/Tilt/Zoom • Flash • Temperature
Depth • Optical Flow • Face Recognition • Object Recognition
Emotion Recognition • Sound Recognition • P2P • SNS Scene Data:
Audio:

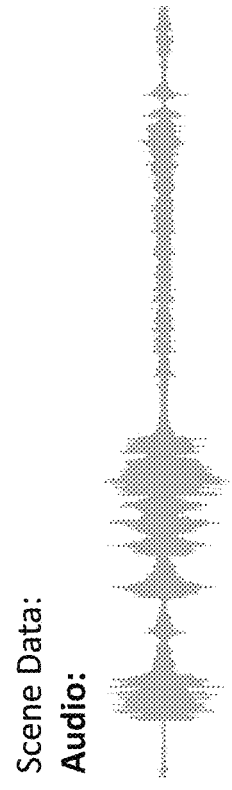

Video Frames:

Frame 1 (RGB)  Frame 2 (IR)  Frame 3 (Depth)  Frame 4 (IR-Zoom)

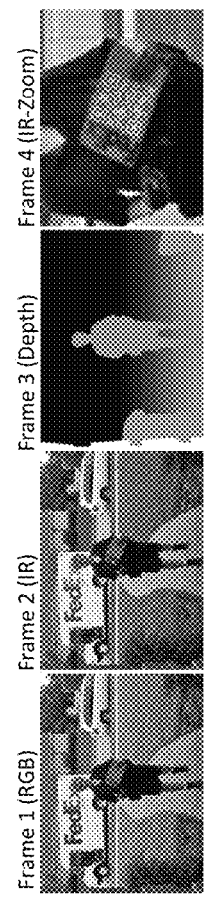

Tagged Metadata:
IR: QR Code printed with IR Ink
Face Recognition: Unknown person detection
Object Recognition: E.g. Human, Knife, Gun, Car, Bicycle, etc.
Depth: Z-direction motion detection

Triggered Action:
Audio in/out for voice interaction. Depth for proximity control.
Notify homeowner. P2P to turn on porch light.

FIG. 9

Application: Face Recognition

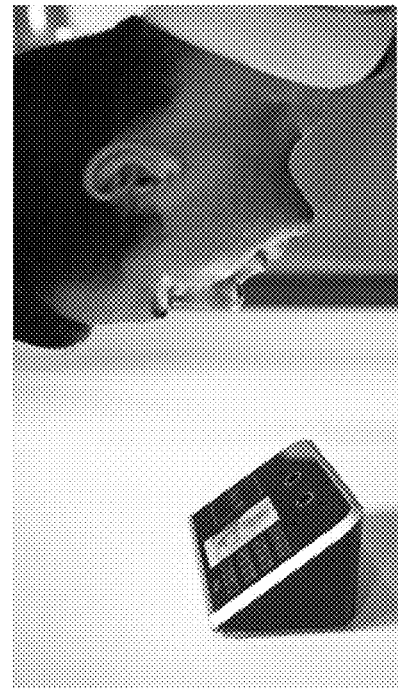

Scene Mode: #6

Camera Capabilities:

[Exposure] • [Gain] • [RGB] • [IR] • Audio

Iris/Aperture • Pan/Tilt/Zoom • Flash • Temperature

[Depth] • Optical Flow • [Face Recognition] • Object Recognition

Emotion Recognition • Sound Recognition • P2P • SNS

Scene Data:
Audio: NOT APPLICABLE

Video Frames:

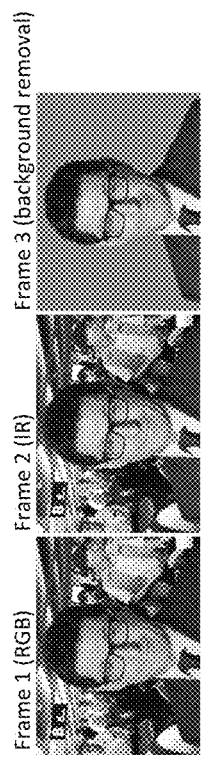

Frame 1 (RGB)  Frame 2 (IR)  Frame 3 (background removal)

Tagged Metadata:
IR: Face data under all lighting condition
Face Recognition: Identity
Depth: 3D face data, face extraction from background

Triggered Action:
Unlock door. Time clock and attendance system. Identity verification.

FIG. 10

Application: Restaurant Camera

Scene Mode: #7

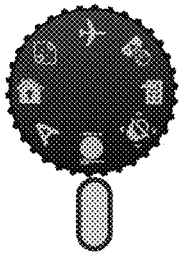

Camera Capabilities:

Exposure · Gain · RGB · IR · Audio
Iris/Aperture · Pan/Tilt/Zoom · Flash · Temperature
Depth · Optical Flow · Face Recognition · Object Recognition
Emotion Recognition · Sound Recognition · P2P · SNS

Scene Data:
Audio:

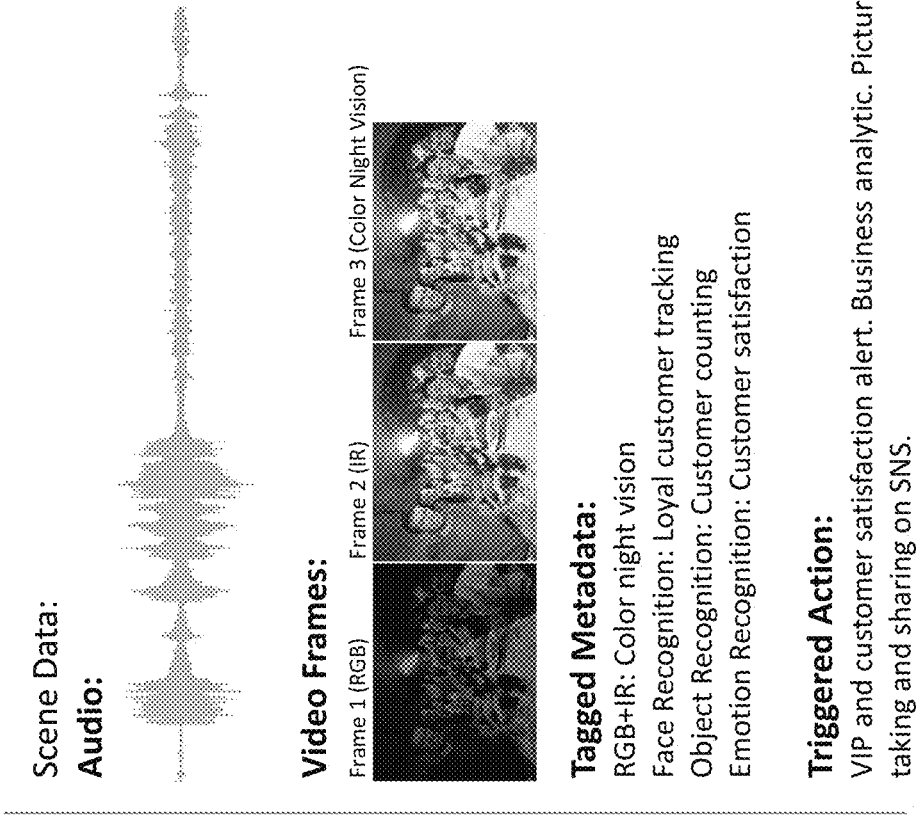

Video Frames:
Frame 1 (RGB)   Frame 2 (IR)   Frame 3 (Color Night Vision)

Tagged Metadata:
RGB+IR: Color night vision
Face Recognition: Loyal customer tracking
Object Recognition: Customer counting
Emotion Recognition: Customer satisfaction

Triggered Action:
VIP and customer satisfaction alert. Business analytic. Picture taking and sharing on SNS.

FIG. 11

| CaptureMode | CapturedData | ProcessedData |
|---|---|---|
| High Dynamic Range (HDR) | Multiple RGB frames at different exposures | Improved Image |
| Biometric | RGB + IR frames | Face/Iris detection |
| Kinetic | 2+ Continuous Frames | Optical Flow |
| Multi-focal | RGB(near focus) + RGB(far focus) | Object at different distance |
| Stereo/Array | Multi-camera capture | Synchronized multi-camera capture |
| Crop | RGB (low res of full image) + RGB (high res of cropped image) | Eye/Object detection |

FIG. 12A

| SceneMode | CaptureModes | | | | | |
|---|---|---|---|---|---|---|
| | HDR | Biometric | Kinetic | Multi-focal | Stereo/Array | Crop |
| Security | ✓ | ✓ | | | ✓ | ✓ |
| Robotic | | ✓ | | ✓ | | |
| Creative | | | | ✓ | | |
| Appliance/IoT | | ✓ | ✓ | | | |
| Health/Lifestyle | ✓ | ✓ | ✓ | | ✓ | |
| Leisure | | ✓ | ✓ | | | |

FIG. 13

SCENE-BASED SENSOR NETWORKS

CROSS-REFERENCE TO RELATED APPLICATION(S)

This application is a continuation of U.S. patent application Ser. No. 15/469,380, "Scene-Based Sensor Networks," filed Mar. 24, 2017; which claims priority under 35 U.S.C. § 119(e) to U.S. Provisional patent application Ser. No. 62/338,948 "Network of Intelligent Surveillance Sensors" filed May 19, 2016, and to 62/382,733 "Network of Intelligent Surveillance Sensors" filed Sep. 1, 2016. The subject matter of all of the foregoing is incorporated herein by reference in their entirety.

BACKGROUND

1. Field of the Invention

This disclosure relates generally to sensor devices, including for example cameras.

2. Description of Related Art

Millions of cameras and other sensor devices are deployed today. There generally is no mechanism to enable computing to easily interact in a meaningful way with content captured by cameras. This results in most data from cameras not being processed in real time and, at best, captured images are used for forensic purposes after an event has been known to have occurred. As a result, a large amount of data storage is wasted to store video that in the end analysis is not interesting. In addition, human monitoring is usually required to make sense of captured videos. There is limited machine assistance available to interpret or detect relevant data in images.

Another problem today is that the processing of information is highly application specific. Applications such as advanced driver assisted systems and security based on facial recognition require custom built software which reads in raw images from cameras using each camera's native low-level interface, and then processes the raw images in a specific way for the target application. The application developers typically must create specific low-level interfaces for each different type of camera just to obtain the raw images, and then they typically must also create application-specific software to process the raw video frames to extract the desired information.

In addition to the low-level camera interfaces, if application developers want to use existing processing or analysis capabilities, such as for image processing or artificial intelligence, they will also have to understand and create interfaces for each of these systems. These systems may use proprietary APIs. An application developer may become locked into a specific vendor's solution, making it difficult to subsequently switch to other solutions.

As a result, the development of applications that make use of networks of sensors is both slow and limited. For example, surveillance cameras installed in an environment typically are used only for security purposes and in a very limited way. This is in part because the image frames that are captured by such systems are very difficult to extract meaningful data from. Similarly, in an automotive environment where there is a network of cameras mounted on a car, the image data captured from these cameras is processed in a way that is very specific to a feature of the car. For example, a forward facing camera may be used only for lane assist. There usually is no capability to enable an application to utilize the data or video for other purposes.

Thus, there is a need for more flexibility and ease in accessing and processing data captured by sensor devices, including images and video captured by cameras.

SUMMARY

The present disclosure overcomes the limitations of the prior art by providing an approach to sensor data based on scenes. One aspect concerns a computer-implemented method for specifying and obtaining a variety of sensor data and processed sensor data related to a scene. The method incorporates a Scene-based API that uses SceneModes and SceneData. An application requesting sensor data communicates a SceneMode via the Scene-based API. The SceneMode determines the SceneData to be captured or provided by a group of one or more sensor devices and/or sensor modules, which typically includes different types of sensor data related to the Scene and also further processed or analyzed data. The application receives the SceneData via the Scene-based API, with the SceneData organized into SceneShots which are samples of the Scene.

For example, the specified SceneMode might be Home Surveillance, in which case the sensor group understands to collect certain types of sensor data (e.g., visible, infrared, audio) and to process the data in certain ways (e.g., motion detection, unexpected noise detection, face recognition of humans). The data collection and processing may also change as the Scene progresses. If an intruder is detected, then more cameras may be brought online, or more image frames captured, or face recognition may be started where it was not used previously. In this way, the application can interface with the sensor group at a higher level, rather than expressly specifying sensor-level settings (such as F/#, shutter speed, etc.) for every sensor in the group.

The Scene-based API and the definitions of the SceneModes and corresponding SceneData preferably are part of a standard. Then, application developers can be agnostic to specific sensor devices, and device manufacturers can determine the best way to implement different functionalities. An API also allows the sharing of data and devices among different applications. For example, if there is a network of sensor devices available, many different applications can access those devices through the use of a common API and defined SceneModes. Compatibility with the API can be implemented within the sensor devices themselves, or in combination with other technology such as middleware or cloud-based services.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the examples shown in the accompanying drawings, in which:

FIGS. 5-11 illustrate different SceneModes.

FIG. 12A is a table defining different CaptureModes.

FIG. 13 is a table defining different SceneModes in terms of CaptureModes.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
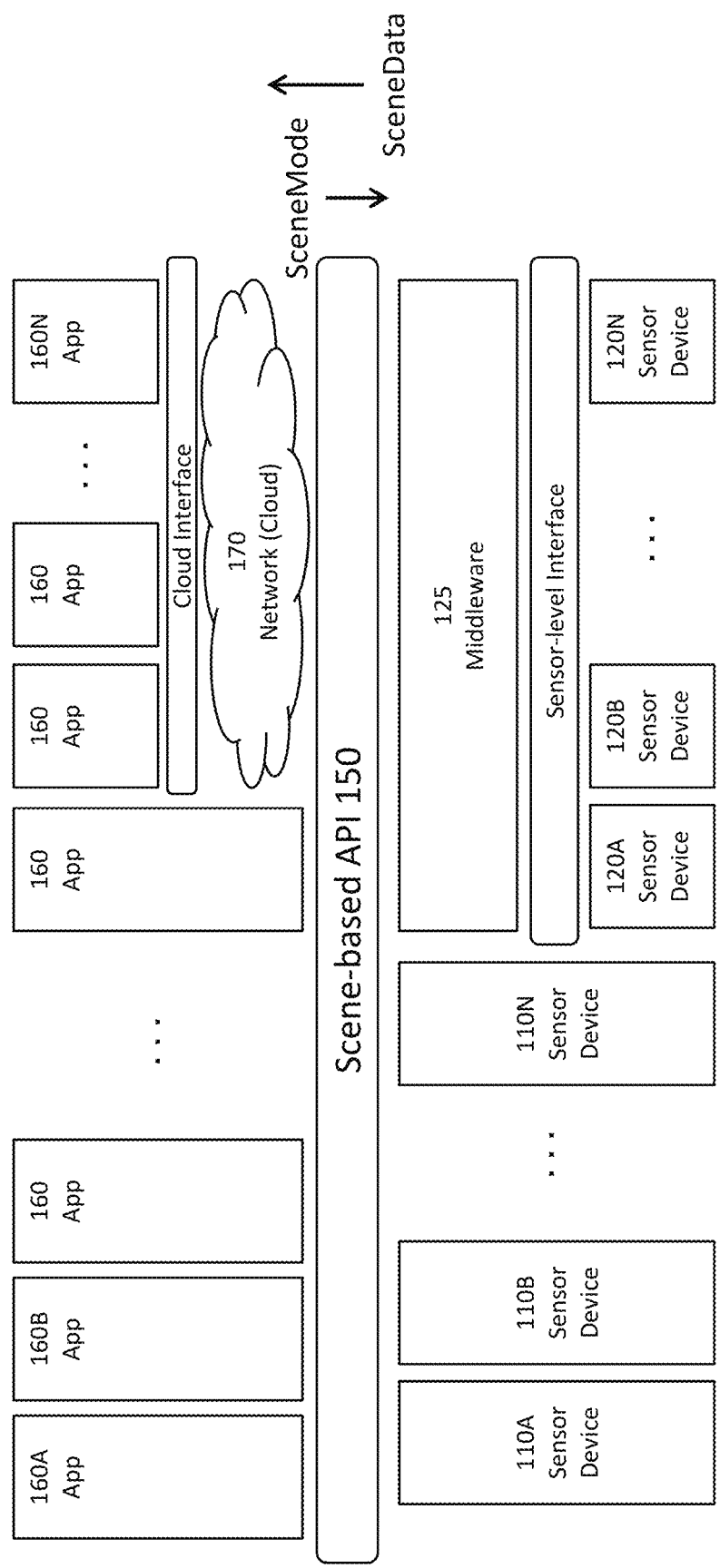
FIG. 1 is a block diagram of a technology stack using a Scene-based API.

FIG. 1 is a block diagram of a technology stack using a Scene-based API 150. In this example, there are a number of sensor devices 110A-N, 120A-N that are capable of capturing sensor data. Examples of sensor devices include cameras and other image capture devices, including monochrome, single-color, multi-color, RGB, other visible, IR, 4-color (e.g., RGB+IR), stereo, multi-view, strobed, and high-speed; audio sensor devices, including microphones and vibration sensors; depth sensor devices, including LIDAR, depth by deblur, time of flight and structured light devices; and temperature/thermal sensor devices. Other sensor channels could also be used, for example motion sensors and different types of material detectors (e.g., metal detector, smoke detector, carbon monoxide detector). There are a number of applications 160A-N that consume the data captured by the sensor devices 110, 120.

The technology stack from the sensor devices 110, 120 to the applications 160 includes a Scene-based API 150, which will be described in further detail below. Some of the applications 160 access the sensor data and sensor devices directly through the API 150, and other applications 160 make access through networks which will generically be referred to as the cloud 170. The sensor devices 110, 120 and their corresponding data can also make direct access to the API 150, or can make access through the cloud (not shown in FIG. 1).

In FIG. 1, some of the sensor devices 110 are directly compatible with the Scene-based API 150. For convenience, these sensor devices 110 will be referred to as Scene-enabled. Other sensor devices 120, for example legacy devices already in the field, are not directly compatible with the Scene-based API 150. That is, they are not Scene-enabled. However, compatibility can be achieved via middleware 125, which interfaces to the Scene-based API 150 on one side and uses a lower level interface (e.g., a sensor-level interface) with the sensor device. In some implementations, the middleware 125 and the sensor device 120 are bundled together at the module level.

For convenience, the technology stack from the API 150 to the sensor devices 110, 120 will be referred to as the sensor-side stack, and the technology stack from the API 150 to the applications 160 will be referred to as the application-side stack. As the technology stack adds new and more features, for example between the applications 160 and the Scene-based API 150, and/or between the sensor devices 110, 120 and the Scene-based API 150, the Scene-based API preferably may be expanded to accommodate such additional features.

The Scene-based API 150 preferably is implemented as a standard and abstracts away from the specifics of the sensor hardware and also abstracts away from implementation specifics for processing and analysis of captured sensor data. In this way, application developers can specify their data requirements at a higher level and need not be concerned with specifying the sensor-level settings (such as F/#, shutter speed, etc.) that are typically required today. In addition, device and module suppliers can then meet those requirements in a manner that is optimal for their products. Furthermore, older sensor devices and modules can be replaced with more capable newer products, so long as compatibility with the Scene-based API 150 is maintained. In general, the applications 160 will be portable to any sensor products that are Scene-enabled.

FIG. 1 shows multiple applications 160 and multiple sensor devices 110, 120. However, any combinations of applications and sensor devices are possible. It could be a single application interacting with one or more sensor devices, one or more applications interacting with a single sensor device, or multiple applications interacting with multiple sensor devices. The applications and sensor devices may be dedicated or they may be shared. In one use scenario, a large number of sensor devices are available for shared use by many applications, which may desire for the sensor devices to acquire different types of data. Thus, data requests from different applications may be multiplexed at the sensor devices. For convenience, the sensor devices 110, 120 that are interacting with an application will be referred to as a sensor group. Note that a sensor group may include just one device.

The API 150 in FIG. 1 is a Scene-based API, which takes into consideration the context for which sensor data is gathered and processed. Using video cameras as an example, a conventional API to a video camera may allow/require the user to specify a handful of sensor-level settings for video capture: f-number, shutter speed, frames per second, resolution, etc. The video camera then captures a sequence of images using those sensor-level settings, and that video sequence is returned to the user. The video camera has no context as to why those settings were selected or for what purpose the video sequence will be used. As a result, the video camera also cannot determine whether the selected settings were appropriate for the intended purpose, or whether the sensor-level settings should be changed as the scene unfolds or as other sensor devices gather relevant data. The conventional video camera API also does not specify what types of additional processing and analysis should be applied to the captured data. All of that intelligence resides on the application-side of a conventional sensor-level API. Conversely, this means that the application developer must understand and address all of these issues and tradeoffs in developing his application.

In contrast, human understanding of the real world generally occurs at a higher level. For example, consider a security-surveillance application. A "Scene" in that context may naturally initiate by a distinct onset of motion in an otherwise static room, proceed as human activity occurs, and terminate when everyone leaves and the room reverts to the static situation. The relevant sensor data may come from multiple different sensor channels and the desired data may change as the Scene progresses. In addition, the information desired for human understanding typically is higher level than the raw image frames captured by a camera. For example, the human end user may ultimately be interested in data such as "How many people are there?", "Who are they?", "What are they doing?", "Should the authorities be alerted?" In a conventional system, the application developer would have to first determine and then code this intelligence, including providing individual sensor-level settings for each relevant sensor device.

In the Scene-based API 150, some or all of this is moved from the application-side of the API to the sensor-side of the API, for example into the sensor devices/modules 110,120, into the middleware 125, or into other components (e.g., cloud-based services) that are involved in generating SceneData to be returned across the API. As one example, the application developer may simply specify different SceneModes, which define what high level data should be returned to the application. This, in turn, will drive the selections and configurations of the sensor channels optimized for that mode, and the processing and analysis of the sensor data. In the surveillance example, the application specifies a Surveillance SceneMode, and the sensor-side technology stack then takes care of the details re: which types of sensor devices are used when, how many frames per second, resolution, etc. The sensor-side technology stack also takes care of the details re: what types of processing and analysis of the data should be performed, and how and where to perform those.

In FIG. 1, this intelligence resides in the middleware 125 or in the devices 110 themselves if they are smart devices (i.e., compatible with the Scene-based API 150). Auxiliary processing, provided off-device or on a cloud basis, may also implement some of the intelligence required to generate the requested data.

This approach has many possible advantages. First, the application developers can operate at a higher level that preferably is more similar to human understanding. They do not have to be as concerned about the details for capturing, processing or analyzing the relevant sensor data or interfacing with each individual sensor device or each processing algorithm. Preferably, they would specify just a high-level SceneMode and would not have to specify any of the specific sensor-level settings for individual sensor devices or the specific algorithms used to process or analyze the captured sensor data. In addition, it is easier to change sensor devices and processing algorithms without requiring significant rework of applications. For manufacturers, making smart sensor devices (i.e., compatible with the Scene-based API) will reduce the barriers for application developers to use those devices.

Returning to FIG. 1, the data returned across the API 150 will be referred to as SceneData, and it can include both the data captured by the sensor devices, as well as additional derived data. It typically will include more than one type of sensor data collected by the sensor group (e.g., different types of images and/or non-image sensor data) and typically will also include some significant processing or analysis of that data. This data is organized in a manner that facilitates higher level understanding of the underlying Scenes. For example, many different types of data may be grouped together into timestamped packages, which will be referred to as SceneShots. Compare this to the data provided by conventional camera interfaces, which is just a sequence of raw images. With increases in computing technology and increased availability of cloud-based services, the sensor-side technology stack may have access to significant processing capability and may be able to develop fairly sophisticated SceneData. The sensor-side technology stack may also perform more sophisticated dynamic control of the sensor devices, for example selecting different combinations of sensor devices and/or changing their sensor-level settings as dictated by the changing Scene and the context specified by the SceneMode.

Figure 2A:
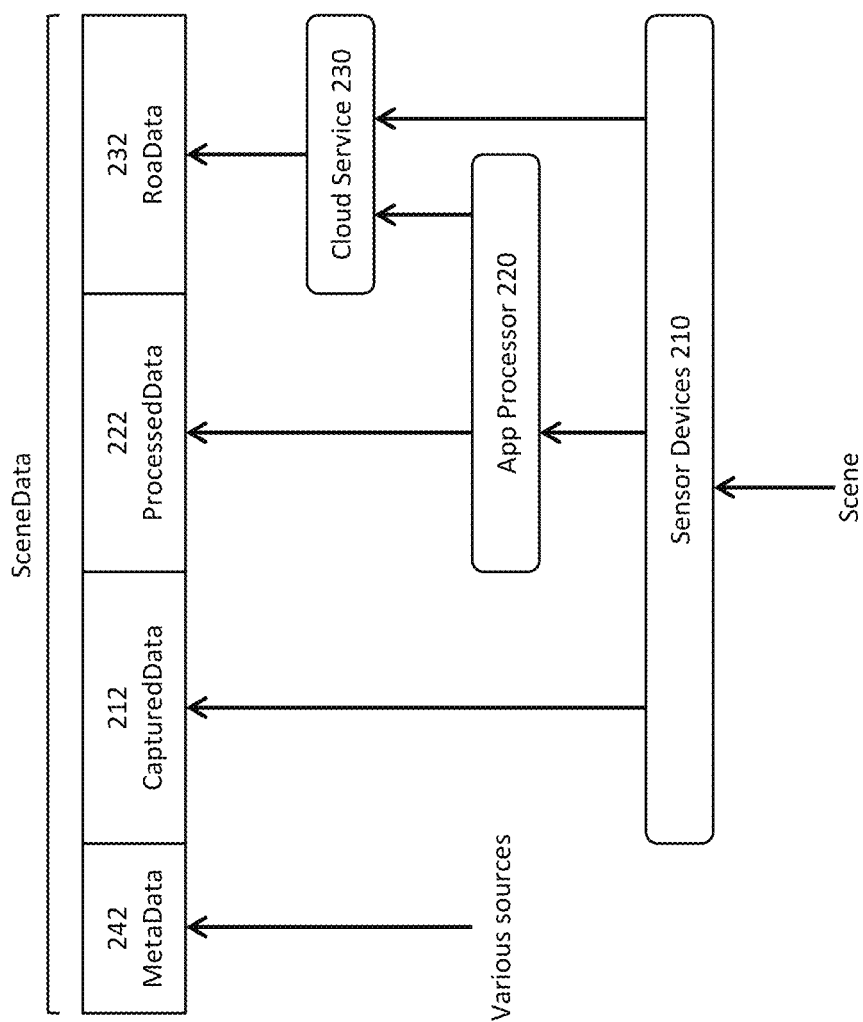
FIG. 2A is a diagram illustrating different types of Scene-Data.

FIG. 2A is a diagram illustrating different types of SceneData. The base data captured by sensor channels 210 will be referred to as CapturedData 212. Within the video context, examples of CapturedData include monochrome, color, infrared, and images captured at different resolutions and frame rates. Non-image types of CapturedData include audio, temperature, ambient lighting or luminosity and other types of data about the ambient environment. Different types of CapturedData could be captured using different sensor devices, for example a visible and an infrared camera, or a camera and a temperature monitor. Different types of CapturedData could also be captured by a single sensor device with multiple sensors, for example two separate on-board sensor arrays. A single sensor could also be time multiplexed to capture different types of CapturedData—changing the focal length, flash, resolution, etc. for different frames.

CapturedData can also be processed, preferably on-board the sensor device, to produce ProcessedData 222. In FIG. 2A, the processing is performed by an application processor 220 that is embedded in the sensor device. Examples of ProcessedData 222 include filtered and enhanced images, and the combination of different images or with other data from different sensor channels. Noise-reduced images and resampled images are some examples. As additional examples, lower resolution color images might be combined with higher resolution black and white images to produce a higher resolution color image. Or imagery may be registered to depth information to produce an image with depth or even a three-dimensional model. Images may also be processed to extract geometric object representations. Wider field of view images may be processed to identify objects of interest (e.g., face, eyes, weapons) and then cropped to provide local images around those objects. Optical flow may be obtained by processing consecutive frames for motion vectors and frame-to-frame tracking of objects. Multiple audio channels from directed microphones can be processed to provide localized or 3D mapped audio. ProcessedData preferably can be data processed in real time while images are being captured. Such processing may happen pixel by pixel, or line by line, so that processing can begin before the entire image is available.

SceneData can also include different types of MetaData 242 from various sources. Examples include timestamps, geolocation data, ID for the sensor device, IDs and data from other sensor devices in the vicinity, ID for the SceneMode, and settings of the image capture. Additional examples include information used to synchronize or register different sensor data, labels for the results of processing or analyses (e.g., no weapon present in image, or faces detected at locations A, B and C), and pointers to other related data including from outside the sensor group.

Any of this data can be subject to further analysis, producing data that will be referred to generally as ResultsOfAnalysisData, or RoaData 232 for short. In the example of FIG. 2, the analysis is artificial intelligence/machine learning performed by cloud resources 230. This analysis may also be based on large amounts of other data. Compared to ProcessedData, ProcessedData typically is more independent of the SceneMode, producing intermediate building blocks that may be used for many different types of later analysis. RoaData tends to be more specific to the end function desired. As a result, the analysis for RoaData can require more computing resources. Thus, it is more likely to occur off-device and not in real-time during data capture.

SceneData also has a temporal aspect. In conventional video, a new image is captured at regular intervals according to the frame rate of the video. Each image in the video sequence is referred to as a frame. Similarly, a Scene typically has a certain time duration (although some Scenes can go on indefinitely) and different "samples" of the Scene are captured/produced over time. To avoid confusion, these samples of SceneData will be referred to as SceneShots rather than frames, because a SceneShot may include one or more frames of video. The term SceneShot is a combination of Scene and snapshot.

Compared to conventional video, SceneShots can have more variability. SceneShots may or may not be produced at regular time intervals. Even if produced at regular time intervals, the time interval may change as the Scene progresses. For example, if something interesting is detected in a Scene, then the frequency of SceneShots may be increased. A sequence of SceneShots for the same application or same SceneMode also may or may not contain the same types of SceneData or SceneData derived from the same sensor channels in every SceneShot. For example, high resolution zoomed images of certain parts of a Scene may be desirable or additional sensor channels may be added or removed as a Scene progresses. As a final example, SceneShots or components within SceneShots may be shared between different applications and/or different SceneModes.

Figure 2B:
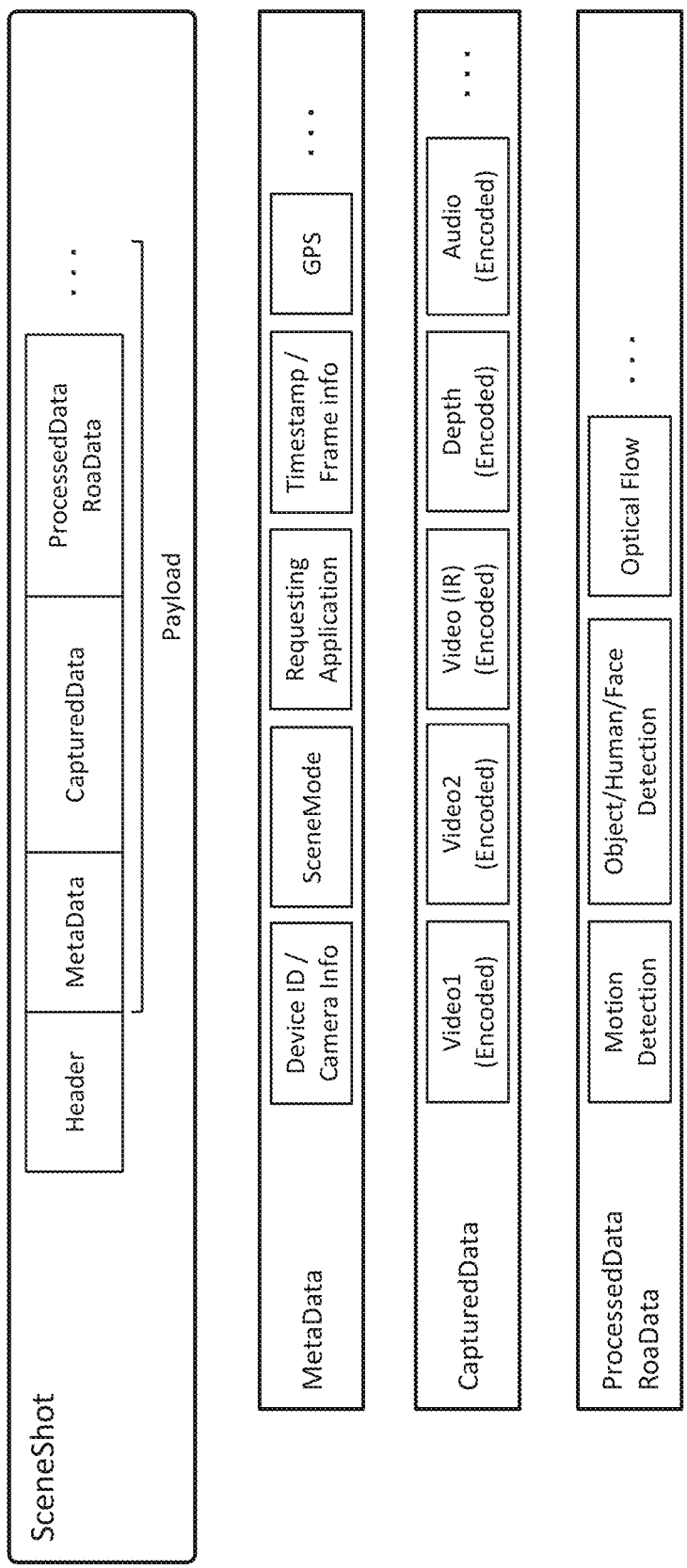
FIG. 2B is a block diagram of a package of SceneData.

FIG. 2B is a block diagram of a SceneShot. This SceneShot includes a header. It also includes the following CapturedData: color video from two cameras, IR video at a different resolution and frame rate, depth measurements, and audio. It includes the following MetaData: sensor device IDs, SceneMode, ID for the requesting application, timestamp, GPS location stamp. It also includes the following ProcessedData and/or RoaData: motion detection, object/human/face detections, and optical flow. Unlike conventional video in which each sequential image generally contains the same types of data, the next SceneShot for this Scene may or may not have all of these same components. Note that FIG. 2B is just an example. For example, the actual sensor data may be quite bulky. As a result, this data may be stored by middleware or on the cloud, and the actual data packets of a SceneShot may include pointers to the sensor data rather than the raw data itself. As another example, MetaData may be dynamic (i.e., included and variable with each SceneShot). However, if the MetaData does not change frequently, it may be transmitted separately from the individual SceneShots or as a separate channel.

Figures 3A, 3B:
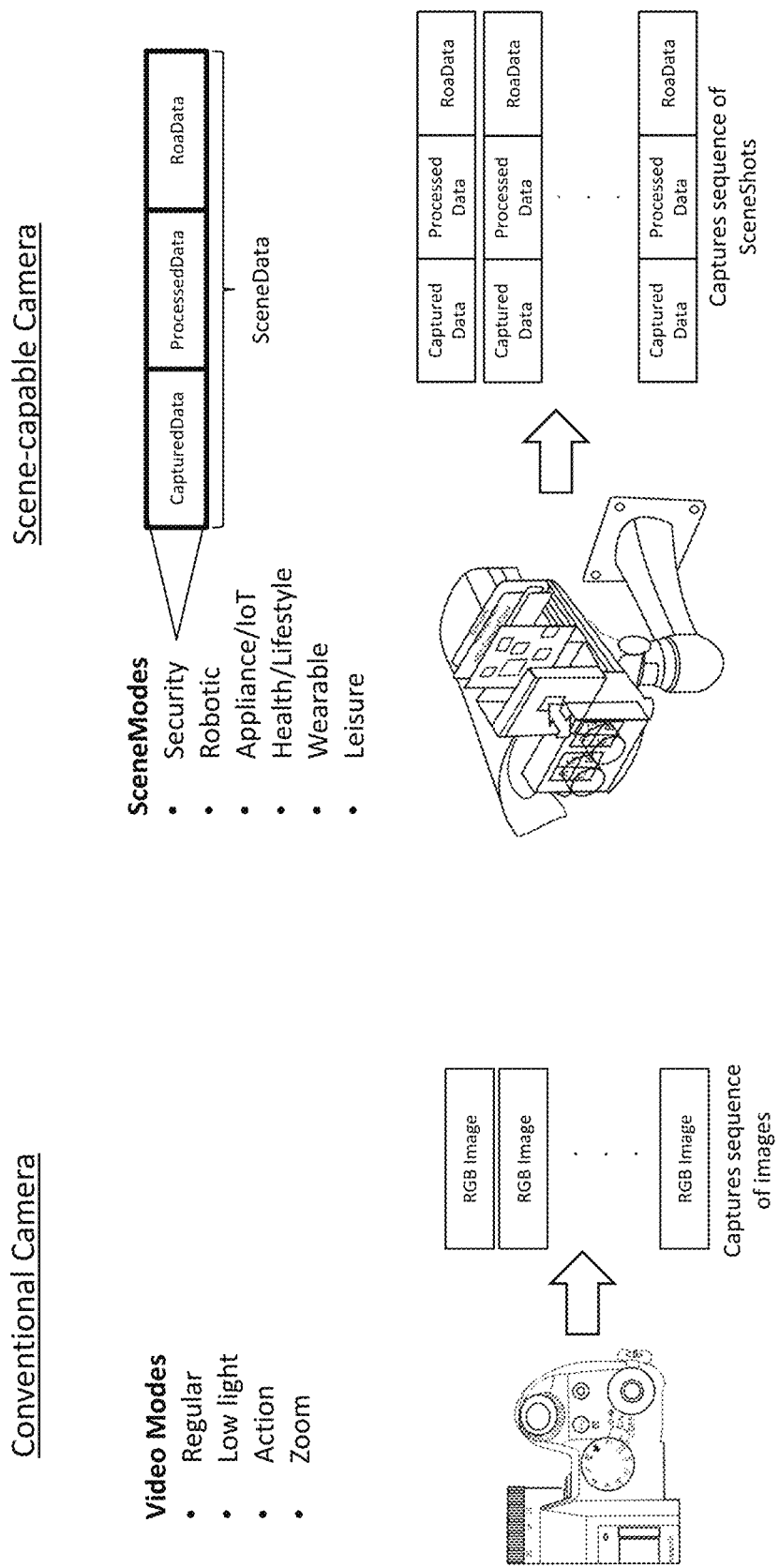
FIG. 3A (prior art) is a diagram illustrating conventional video capture.
FIG. 3B is a diagram illustrating Scene-based data capture and production.

FIGS. 3A and 3B compare conventional video capture with Scene-based data capture and production. FIG. 3A (prior art) is a diagram illustrating conventional video capture. The camera can be set to different modes for video capture: regular, low light, action and zoom modes in this example. In low light mode, perhaps the sensitivity of the sensor array is increased or the exposure time is increased. In action mode, perhaps the aperture is increased and the exposure time is decreased. The focal length is changed for zoom mode. These are changes in the sensor-level settings for camera. Once set, the camera then captures a sequence of images at these settings.

FIG. 3B is a diagram illustrating Scene-based data capture and production. In this example, the SceneModes are Security, Robotic, Appliance/IoT, Health/Lifestyle, Wearable and Leisure, as are described in more detail in FIGS. 12-13. Each of these SceneModes specify a different set of SceneData to be returned to the application, and that SceneData can be a combination of different types of sensor data, and processing and analysis of that sensor data. This approach allows the application developer to specify a SceneMode, and the sensor-side technology stack determines the group of sensor devices, sensor-level settings for those devices, and workflow for capture, processing and analysis of sensor data.

Figure 4A:
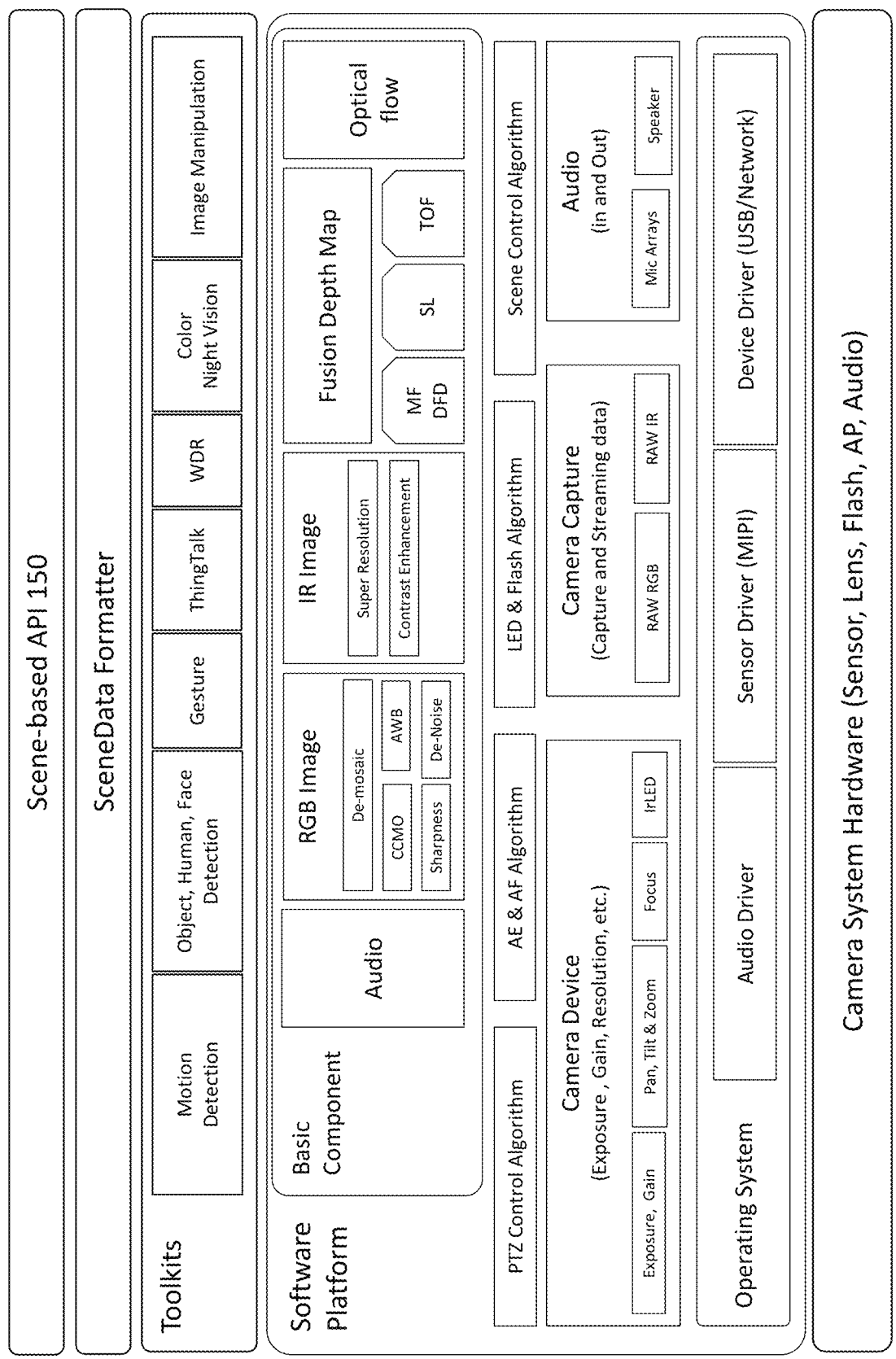
FIG. 4A is a block diagram of middleware that is compliant with a Scene-based API.

Returning to FIG. 1, the applications 160 and sensor channels 110, 120 interface through the Scene-based API 150. The applications 160 specify their SceneModes and the sensor-side technology stack then returns the corresponding SceneData. In many cases, the sensor devices themselves may not have full capability to achieve this. FIG. 4A is a block diagram of middleware 125 that provides functionality to return SceneData requested via a Scene-based API 150. This middleware 125 converts the SceneMode requirements to sensor-level settings that are understandable by the individual sensor devices. It also aggregates, processes and analyzes data in order to produce the SceneData specified by the SceneMode.

The bottom of this stack is the camera hardware. The next layer up is the software platform for the camera. In FIG. 4A, some of the functions are listed by acronym to save space. PTZ refers to pan, tilt & zoom; and AE & AF refer to auto expose and auto focus. The RGB image component includes de-mosaicking, CCMO (color correction matrix optimization), AWB (automatic white balance), sharpness filtering and noise filtering/improvement. The fusion depth map may combine depth information from different depth sensing modalities. In this example, those include MF DFD (Multi Focus Depth by Deblur, which determines depth by comparing blur in images taken with different parameters, e.g., different focus settings), SL (depth determined by projection of Structured Light onto the scene) and TOF (depth determined by Time of Flight). Further up are toolkits and then a formatter to organize the SceneData into SceneShots. In the toolkits, WDR refers to wide dynamic range.

In addition to the middleware, the technology stack may also have access to functionality available via networks, e.g., cloud-based services. Some or all of the middleware functionality may also be provided as cloud-based services. Cloud-based services could include motion detection, image processing and image manipulation, object tracking, face recognition, mood and emotion recognition, depth estimation, gesture recognition, voice and sound recognition, geographic/spatial information systems, and gyro, accelerometer or other location/position/orientation services.

Figure 4D:
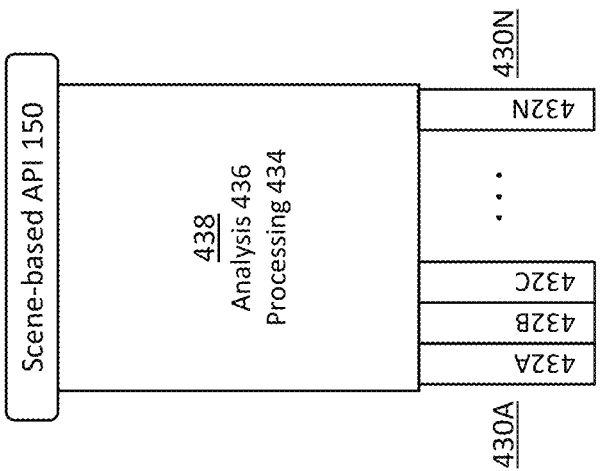
FIGS. 4B-4D are block diagrams of the sensor-side technology stack using sensor devices of varying capabilities.
Figure 4C:
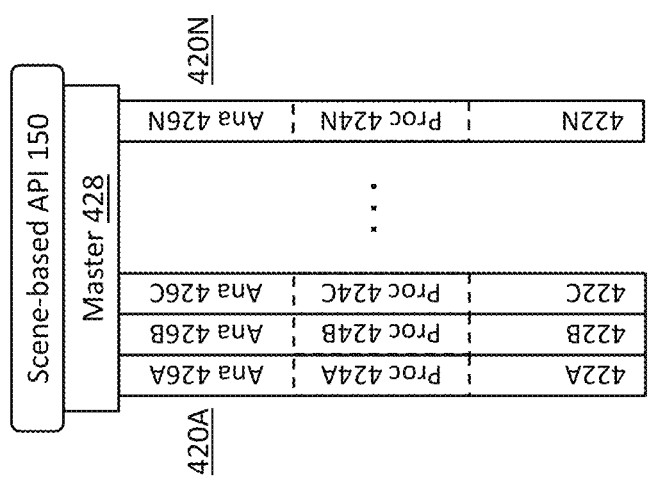
Figure 4B:
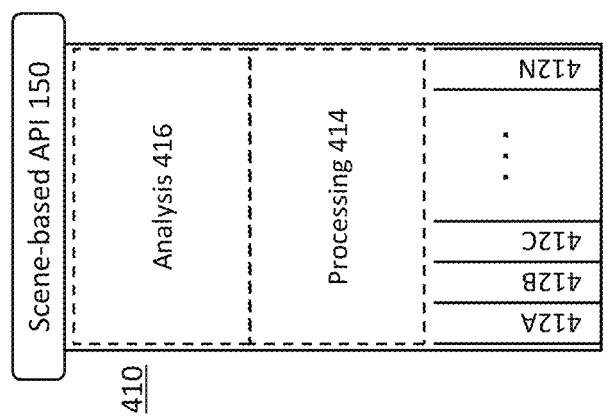

FIGS. 4B-4D are block diagrams of the sensor-side technology stack using sensor devices of varying capabilities. In these examples, assume that the SceneMode requires the capture of a number of different types of sensor data, and also requires subsequent processing and analysis. Further assume for the purposes of illustration that the processing can be done on-device and that the analysis cannot, although this will not always be the case. In FIG. 4B, a single sensor device is fully capable of capturing and producing the SceneData. The device 410 includes sufficient sensors to produce the required sensor data 412A-N. For example, it may include multiple cameras (or a camera used at different settings to capture different types of images) and a microphone or other sensors. It also includes on-board processing capability 414 and has access to analysis capability 416, for example via cloud-based interfaces.

In FIG. 4C, each of the sensor devices 420A-N includes its own processing 424 and analysis 426 capability. This could be built into the sensor devices or could be added by a separate middleware layer bundled with the sensor devices. However, multiple devices are required to capture all of the different types of sensor data 422A-N. For example, there may be separate cameras and a separate microphone to capture different types of images and audio. Each device 420 performs on-board processing 424 of the sensor data that is captured. Analysis cannot be done entirely within each device 420, so a thin master layer 428 coordinates analysis among the different devices.

In FIG. 4D, each of the sensor devices 430A-N is a dumb device that captures only one type of sensor data 432A-N and does not perform any processing or analysis. Those functions 434,436 are performed by a more robust middleware layer 438 (such as the middleware shown in FIG. 4A), which also coordinates the data capture by the individual devices 430A-N.

These are merely examples used to illustrate different concepts. Other situations will be apparent. For example, it is not required that all sensor devices in a sensor group have the same capability, as was the case in the examples shown above.

The SceneMode provides some context for the Scene at hand, and the SceneData returned preferably is a set of data that is more relevant (and less bulky) than the raw sensor data captured by the sensor channels. In one approach, Scenes are built up from more atomic Events. In one model, individual sensor samples are aggregated into SceneShots, Events are derived from the SceneShots, and then Scenes are built up from the Events.

The building blocks of Events are derived from monitoring and analyzing sensory input (e.g. output from a video camera, a sound stream from a microphone, or data stream from a temperature sensor). The interpretation of the sensor data as Events is framed according to the context (is it a security camera or a leisure camera, for example). Examples of Events may include the detection of a motion in an otherwise static environment, recognition of a particular sound pattern, or in a more advanced form recognition of a particular object of interest (such as a gun or an animal). Events can also include changes in sensor status, such as camera angle changes, whether intended or not. General classes of Events includes motion detection events, sound detection events, device status change events, ambient events (such as day to night transition, sudden temperature drop, etc.), and object detection events (such as presence of a weapon-like object). The identification and creation of Events could occur within the sensor device itself. It could also be carried out by processor units in the cloud.

The interpretation of Events depends on the context of the Scene. The appearance of a gun-like object captured in a video frame is an Event. It is an "alarming" Event if the environment is a home with a toddler and would merit elevating the status of the Scene (or spawning a new sub-Scene) to require immediate reaction from the monitor. However, if the same Event is registered in a police headquarters, the status of the Scene may not be elevated until further qualifications were met.

As another example, consider a security camera monitoring the kitchen in a typical household. Throughout the day, there may be hundreds of Events. The Events themselves preferably are recognized without requiring sophisticated interpretation that would slow down processing. Their detection preferably is based on well-established but possibly specialized algorithms, and therefore can preferably be implemented either on-board the sensor device or as the entry level cloud service. Given that timely response is important and the processing power at these levels is weak, it is preferable that the identification of Events is not burdened with higher-level interpretational schemes.

As such, many Events may be easily partitioned into separate Scenes either through their natural start- and stop-markers (such as motion sensing, light on or off, or simply by an arbitrarily set interval). Some of them may still leave ambiguity. The higher-level interpretation of Events into Scenes may be recognized and managed by the next level manager that oversees thousands of Events streamed to it from multiple sensor devices. The same Event such as a motion detection may reach different outcomes as a potential Scene if the context (SceneMode) is set as a Daytime Office or a Night Time Home during Vacation. In the kitchen example, enhanced sensitivity to some signature Events may be appropriate: detection of fire/smoke, light from refrigerator (indicating its door is left open), in addition to the usual burglary and child-proof measures. Face recognition may also be used to eliminate numerous false-positive notifications. A Scene involving a person who appears in the kitchen after 2 am, engaged in opening the freezer and cooking for a few minutes, may just be a benign Scene once the person is recognized as the home owner's teenage son. On the other hand, a seemingly harmless but persistent light from the refrigerator area in an empty home set for the Vacation SceneMode may be a Scene worth immediate notification.

Note that Scenes can also be hierarchical. For example, a Motion-in-Room Scene may be started when motion is detected within a room and end when there is no more motion, with the Scene bracketed by these two timestamps. Sub-Scenes may occur within this bracketed timeframe. A sub-Scene of a human argument occurs (e.g. delimited by ArgumentativeSoundOn and Off time markers) in one corner of the room. Another sub-Scene of animal activity (DogChasingCatOn & Off) is captured on the opposite side of the room. This overlaps with another sub-Scene which is a mini crisis of a glass being dropped and broken. Some Scenes may go on indefinitely, such as an alarm sound setting off and persisting indefinitely, indicating the lack of any human intervention within a given time frame. Some Scenes may relate to each other, while others have no relations beyond itself.

Depending on the application, the Scenes of interest will vary and the data capture and processing will also vary. SceneModes allow different modes to be defined for the sensor-side technology stack, with various parameters set to control the capture and/or processing of SceneData for that mode. Examples of SceneModes include a Home Surveillance, Baby Monitoring, Large Area (e.g., Airport) Surveillance, Personal Assistant, Smart Doorbell, Face Recognition, and a Restaurant Camera SceneMode. Other examples include Security, Robot, Appliance/IoT (Internet of Things), Health/Lifestyle, Wearables and Leisure SceneModes. For each of these SceneModes, the sensor-side technology stack is set to capture and produce appropriate SceneData.

FIGS. 5-11 describe examples of SceneModes. FIG. 5 illustrates SceneMode #1, which in this example is used by a home surveillance application. In the lefthand side of FIG. 5, each of the icons on the dial represents a different SceneMode. In FIG. 5, the dial is set to the house icon which indicates SceneMode #1. The SceneData specified by this SceneMode is shown in the righthand side of FIG. 5. The SceneData includes audio, RGB frames, IR frames. It also includes metadata for motion detection (from optical flow capability), human detection (from object recognition capability) and whether the humans are known or strangers (from face recognition capability). To provide the required SceneData, the sensor-side technology stack typically will use the image and processing capabilities which are boxed on the lefthand side of FIG. 5: exposure, gain, RGB, IR, audio, optical flow, face recognition, object recognition and P2P, and sets parameters for these functions according to the mode. Upon detection of unrecognized humans, the application sounds an alarm and notifies the owner. The use of SceneData beyond just standard RGB video frames helps to achieve automatic quick detection of intruders, triggering appropriate actions.

Figure 6:
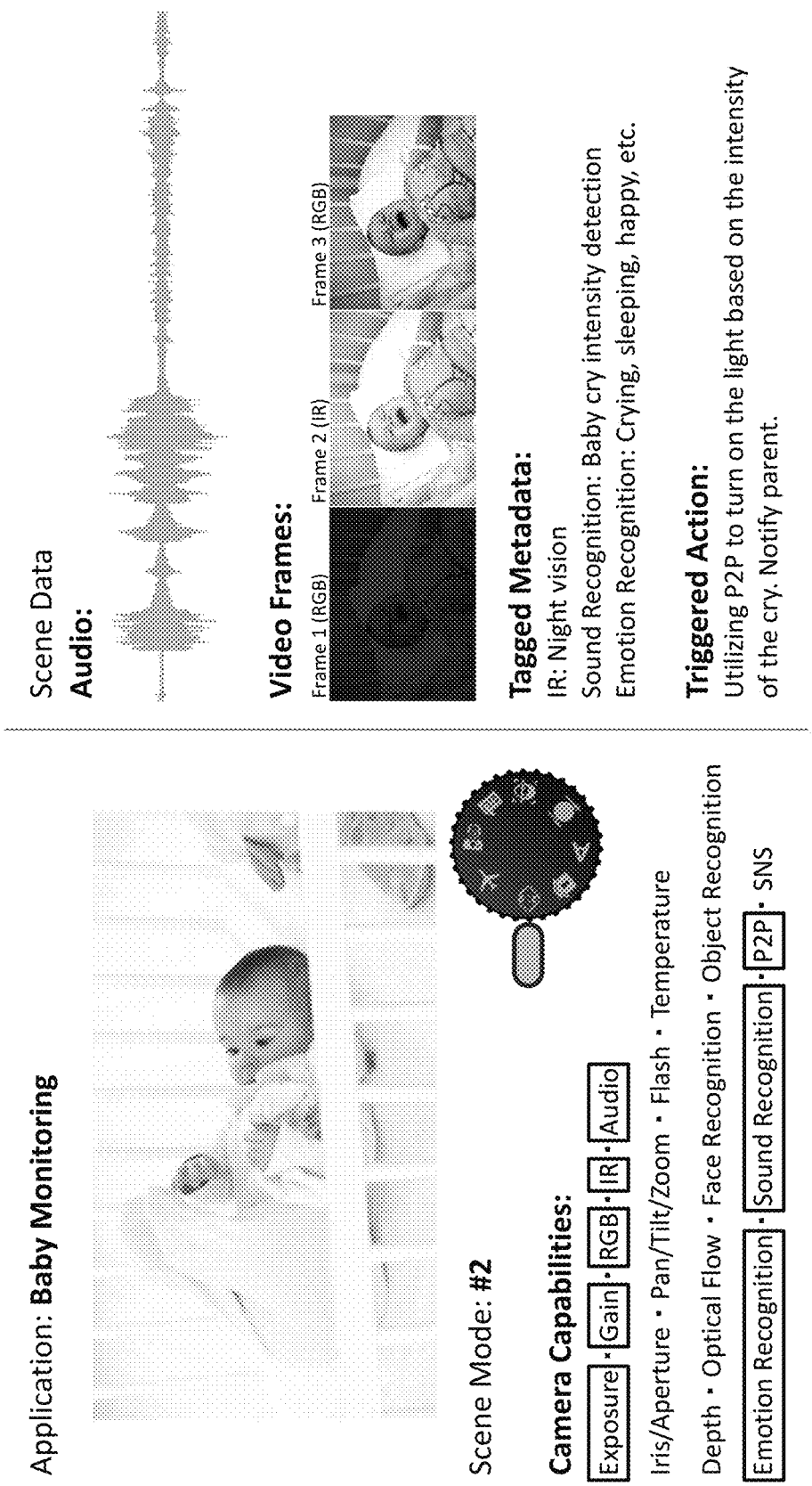

FIG. 6 illustrates SceneMode #2, which in this example is used by a baby monitoring application. The format of FIG. 6 is the same as FIG. 5. The mode dial is set to the baby face icon, indicating SceneMode #2. This mode typically will use exposure, gain, RGB, IR, audio, emotion recognition, sound recognition and P2P capabilities. The SceneData for this mode includes audio, multiple RGB frames, IR frames for night vision. It also includes metadata for sound recognition and emotion recognition. For example, when the baby is sleeping, the lights are turned off so the RGB images may be too dark. Upon sound recognition of the baby crying, the SceneMode may specify that the IR images are captured and/or analyzed. Emotion recognition may determine that the baby is scared. The application then triggers the light to turn on and notifies the parents. When the light turns on, additional RGB images may be captured.

FIGS. 7-11 illustrate additional modes, using the same format as FIGS. 5-6. In FIG. 7, SceneMode #3 is used by an airport surveillance application. For example, the application may detect abnormal or dangerous situations. Capabilities may include recognizing and tracking known faces, or detecting and analyzing various actions, objects and/or sounds. In FIG. 8, the application is a personal assistant, but with intelligent vision. For example, object recognition and/or emotion recognition can be used as additional inputs to improve artificial intelligence interactions. In FIG. 9, the application is a smart doorbell. Capabilities may include recognition of QR codes, recognition of objects and faces for security, and depth estimation to object or people. In FIG. 10, the application is face recognition. The use of different capabilities—RGB, IR, zoom, depth—allows more accurate face recognition. FIG. 11 is an example of a restaurant camera. It could automatically take pictures of guests or parties for their usage, or could also recognize emotions to track customer satisfaction. The applications identified in FIGS. 5-11 are just examples. Other applications could also use the SceneModes shown.

There can be a large number of SceneModes, depending on the variety of applications and Scenes to be analyzed. However, many of these SceneModes may be based on common building blocks that are abstracted away from the specifics of the underlying sensor devices. FIGS. 12-13 illustrate an approach to SceneModes, in which the SceneModes are based on more basic building blocks called CaptureModes.

Figure 12B:
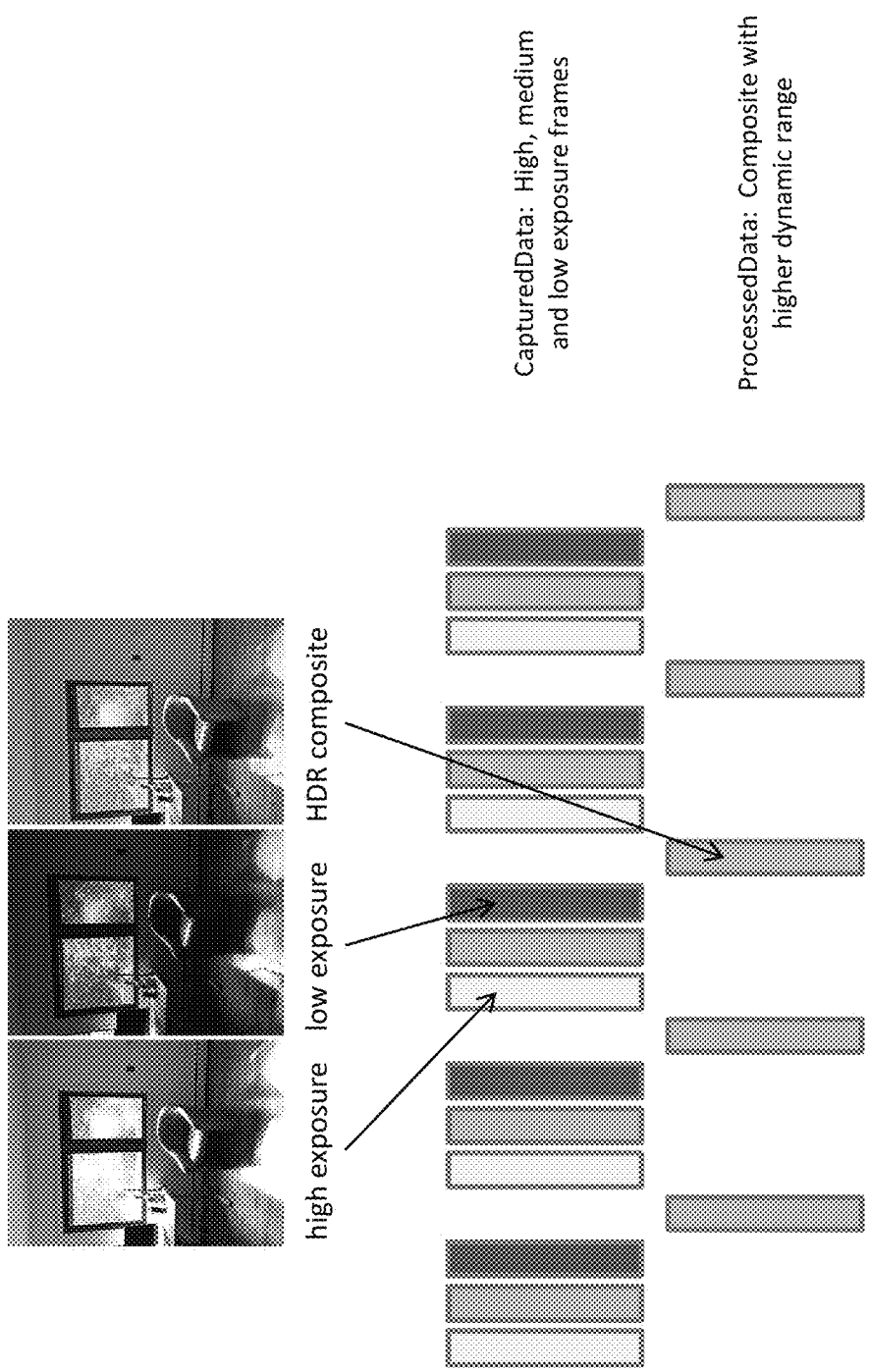
FIG. 12B illustrates the HDF CaptureMode of FIG. 12A.

FIG. 12A is a table defining different CaptureModes. The CaptureModes correspond to different types of sensor data collection and production that may be used in different applications. The first row is the High Dynamic Range (HDR) CaptureMode, which is illustrated in FIG. 12B. In this mode, three frames are captured for every SceneShot: one at high exposure, one at medium exposure and one at low exposure. These are combined to produce one frame with higher dynamic range. In the images shown, the outdoors seen through the window is washed out in the high exposure image and the chair and room walls are too dark in the low exposure image. The HDR composite image provides good exposure for both the outdoors and the indoors.

Figure 12C:
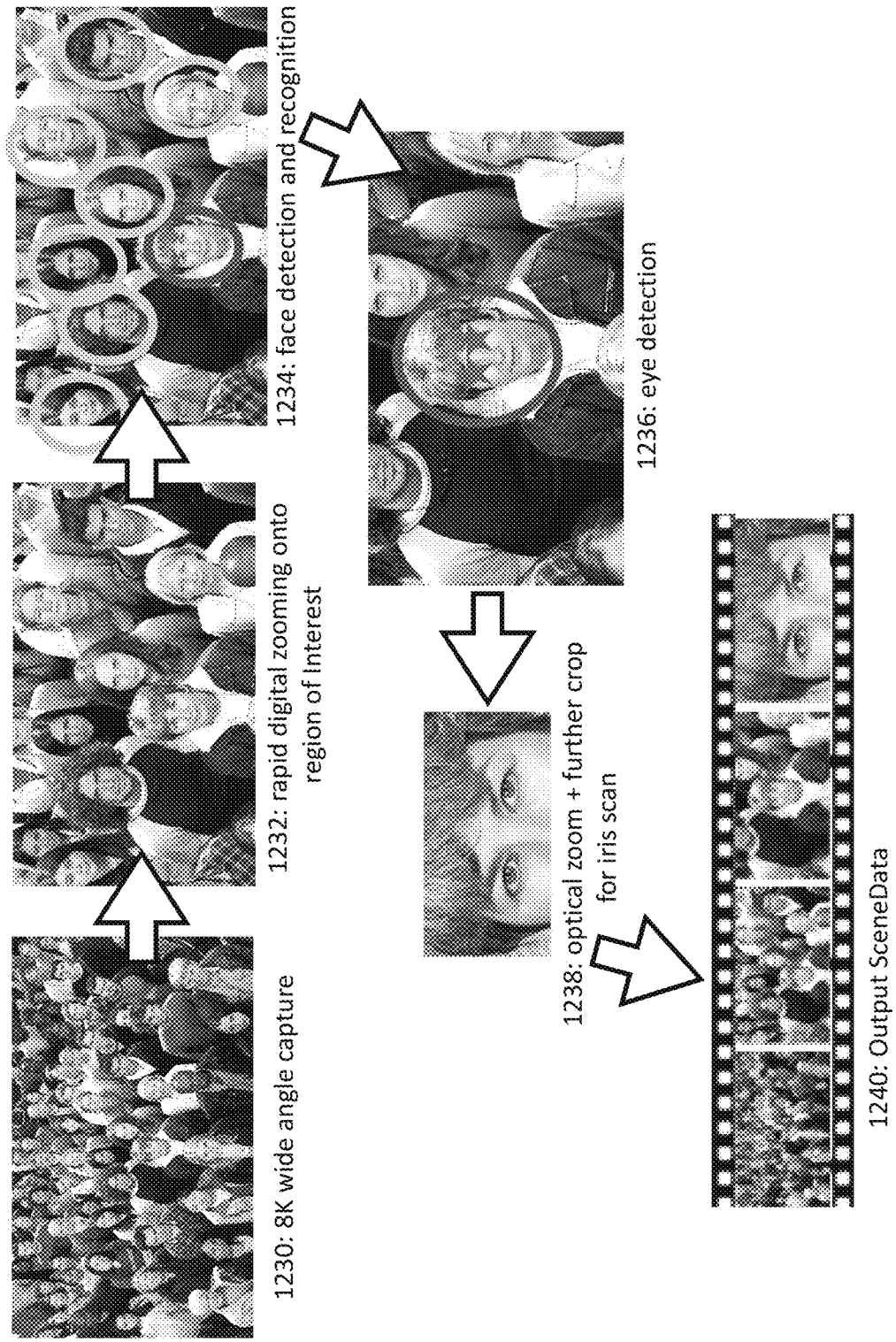
FIG. 12C illustrates the Crop CaptureMode of FIG. 12A.

The bottom row of the table shows the Crop CaptureMode, which is illustrated in FIG. 12C. In this mode, a low resolution color image 1230 with large field of view is captured. Rapid digital zoom magnifies 1232 a region of interest. This is followed by face detection and recognition 1234 to identify the subject of interest. Then the locations of the eyes are determined 1236. The cameras are directed to the eye locations 1238, using optical zoom and digital cropping. These images can then be used for biometric iris identification. The bottom of FIG. 12C shows a SceneShot 1240. The SceneShot could also include MetaData for the subject's identity.

For the remainder of the table in FIG. 12A, the Biometric CaptureMode uses RGB and IR images, and processes these to produce face/iris detection. The Kinetic CaptureMode captures consecutive image frames and compares them to produce optical flow data. The Multi-focal CaptureMode captures images using different focal lengths. From this, depth estimates can be produced. For the Stereo/Array CaptureMode, images of a Scene are captured by multiple cameras and these images are synchronized and registered to each other. In FIG. 12A, each CaptureMode includes both CapturedData and ProcessedData. This is not required. For example, a CaptureMode might be defined to include just CapturedData or to include ProcessedData that can be produced by the sensor device. In this way, the CaptureMode can be used as part of a sensor-level API which is higher level than the current interfaces that require the express specification of sensor-level settings.

FIG. 13 is a table that shows which SceneModes might use which CaptureModes. The SceneModes in this example are Security, Robotic, Creative, Appliance/IoT, Health/Lifestyle and Leisure. The Security SceneMode uses the HDR, Biometric, Stereo/Array and Crop CaptureModes to produce the SceneData required by that mode. The remaining rows provide additional examples of SceneModes defined in terms of CaptureModes. The definition of SceneModes can also be augmented by additional information. For example, the Security SceneMode could be defined as the four checked CaptureModes, plus additional processed or analyzed data not included in these four CaptureModes.

Other hierarchical structures are also possible. For example, security might be a top-level SceneMode, security.domestic is a second-level SceneMode, security.domestic.indoors is a third-level SceneMode, and security.domestic.indoors.babyroom is a fourth-level SceneMode. Each lower level inherits the attributes of its higher level SceneModes.

In cases where a Scene-based API is standardized, the standard may include a set of predefined SceneModes. This could be implemented by expressly defining each of the possible SceneModes. Alternately, the CaptureModes could be predefined and application developers could then effectively define their SceneModes by calling various CaptureModes. As an alternative, the set of SceneModes supported by the standard may be extendible by user-defined SceneModes.

Figure 14A:
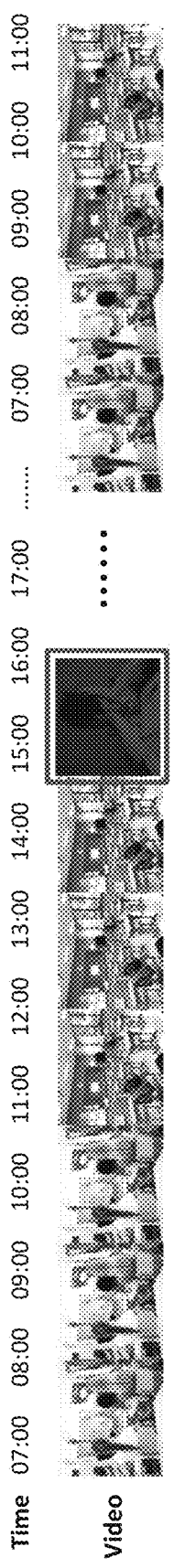
FIG. 14A illustrates a video stream captured by a conventional surveillance system.

FIGS. 14A-14D illustrate a comparison of a conventional surveillance system with one using Scenes. FIG. 14A shows a video stream captured by a conventional surveillance system. In this example, the video stream shows a child in distress at 15:00. This was captured by a school surveillance system but there was no automatic notification and the initial frames are too dark. The total number of video frames captured in a day (10 hours) at a frame rate of 30 fps=10 hours×60×60×30 fps=1.16 millions frames. Storing and searching through this library of video is time consuming and costly. The abnormal event is not automatically identified and not identified in real-time. In this example, there was bad lighting condition when captured and the only data is the raw RGB video data. Applications and services must rely on the raw RGB stream.

Figure 14B:
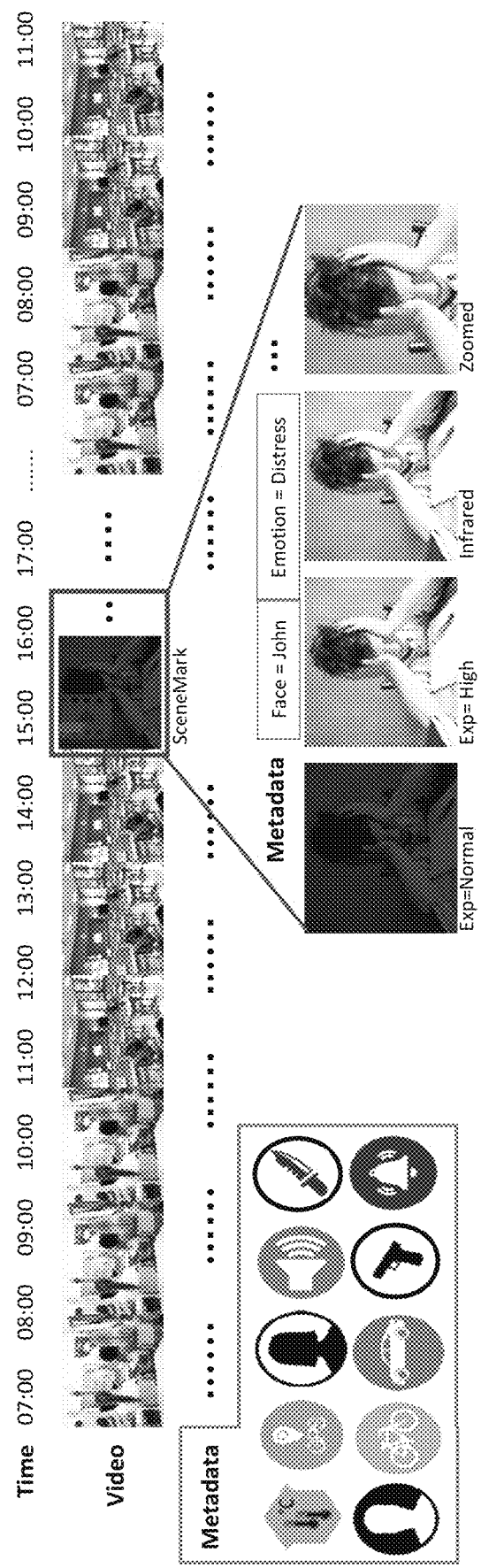
FIGS. 14B-14D illustrate Scene-based surveillance systems.

FIG. 14B shows the same situation, but using Scenes and the concepts described above. In this example, the initial Scene is defined as the school during school hours, and the initial SceneMode is tailored for general surveillance of a large area. When in this SceneMode, there is an Event of sound recognition that identifies a child crying. This automatically marks the school Scene at 15:00.

The Event may also spawn a sub-Scene for the distressed child using a SceneMode that captures more data. The trend for sensor technology is towards faster frame rates with shorter capture times (faster global shutter speed). This enables the capture of multiple frames which are aggregated into a single SceneShot, or some of which is used as MetaData. For example, a camera that can capture 120 frames per second (fps) can provide 4 frames for each SceneShot, where the Scene is captured at 30 SceneShots per second. MetaData may also be captured by other devices, such as IoT devices. In this example, each SceneShot includes 4 frames: 1 frame of RGB with normal exposure (which is too dark), 1 frame of RGB with adjusted exposure, 1 frame of IR, and 1 frame zoomed in. The extra frames allow for better face recognition and emotion detection. The face recognition and emotion detection results and other data are tagged as part of the MetaData. This can also speed up searching by keyword. A notification is sent to the teacher, along with a thumbnail of the scene and shortcut to the video at the marked location. The SceneData is a collection of RGB, IR, zoom-in and focused image streams. Applications and services have access to more intelligent and richer scene data for more complex and/or efficient analysis.

Figure 14C:
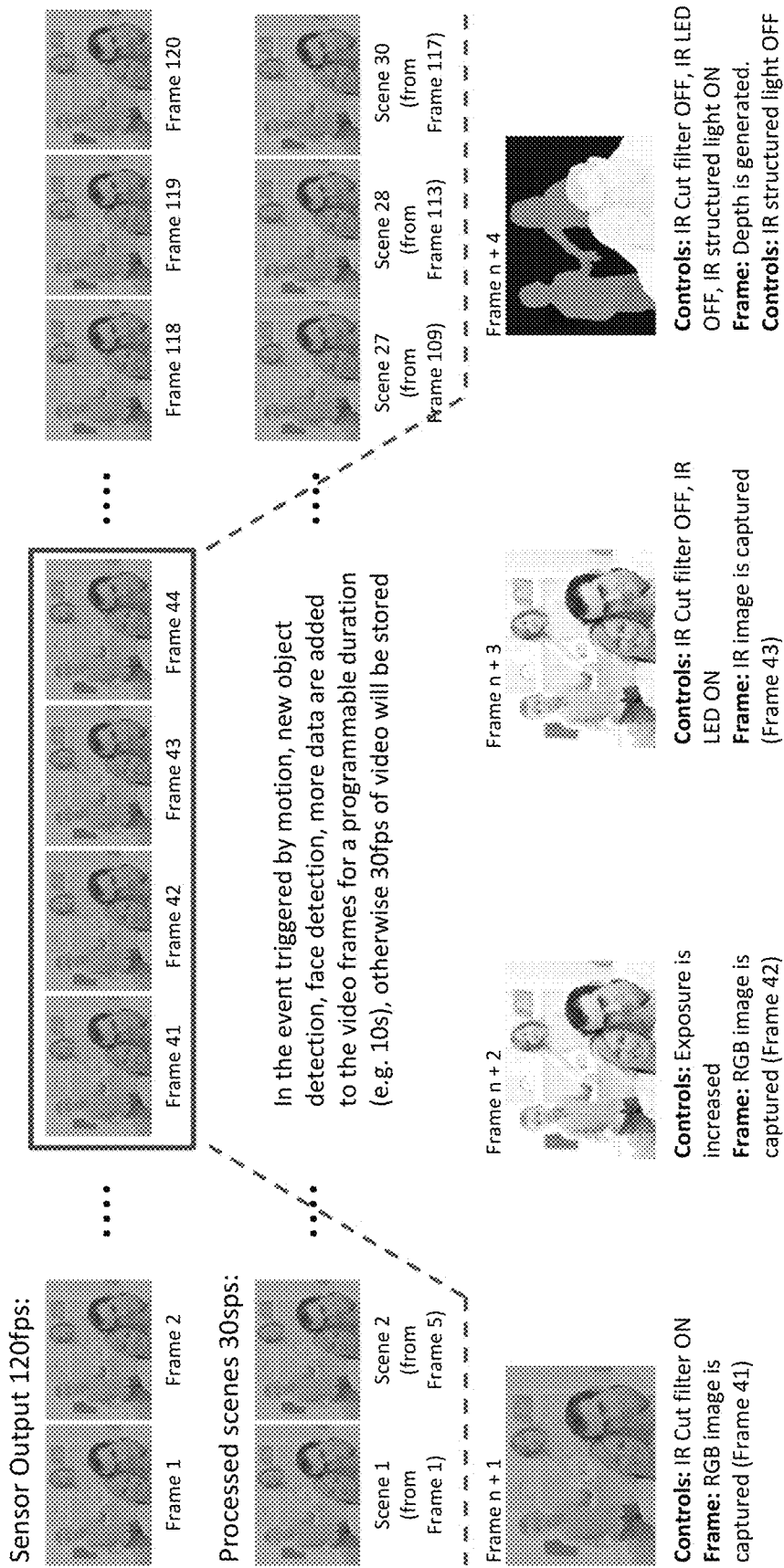

FIG. 14C illustrates another example where a fast frame rate allows multiple frames to be included in a single SceneData SceneShot. In this example, the frame rate for the sensor device is 120 fps, but the Scene rate is only 30 SceneShots per second, so there are 4 frames for every SceneShot. Under normal operation, every fourth frame is captured and stored as SceneData. However, upon certain triggers, additional frames are captured so that SceneData may include multiple frames captured under different conditions. In this example, the camera is a 3-color camera, but which can be filtered to effectively capture an IR image.

Figure 14D:
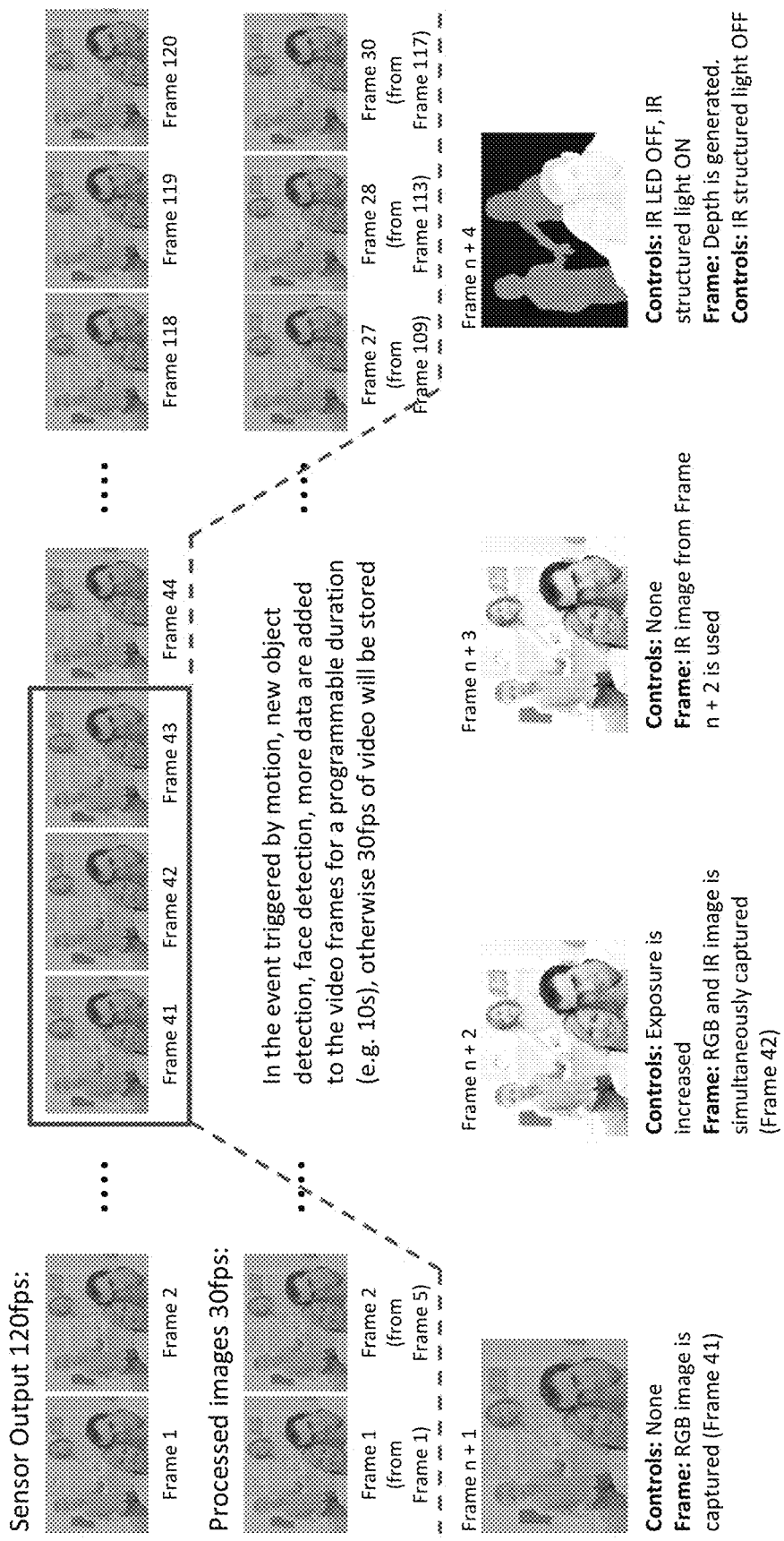

In FIG. 14D, the camera is a 4-color camera, which can simultaneously capture RGB and IR images. In this example, the four frames for one SceneShot (Frames n+1 to n+4) are captured using three timeslots (Frames 41-43). In fact, additional frames could be captured during Frame 44, so that there are more than four frames per SceneShot.

Figure 15:
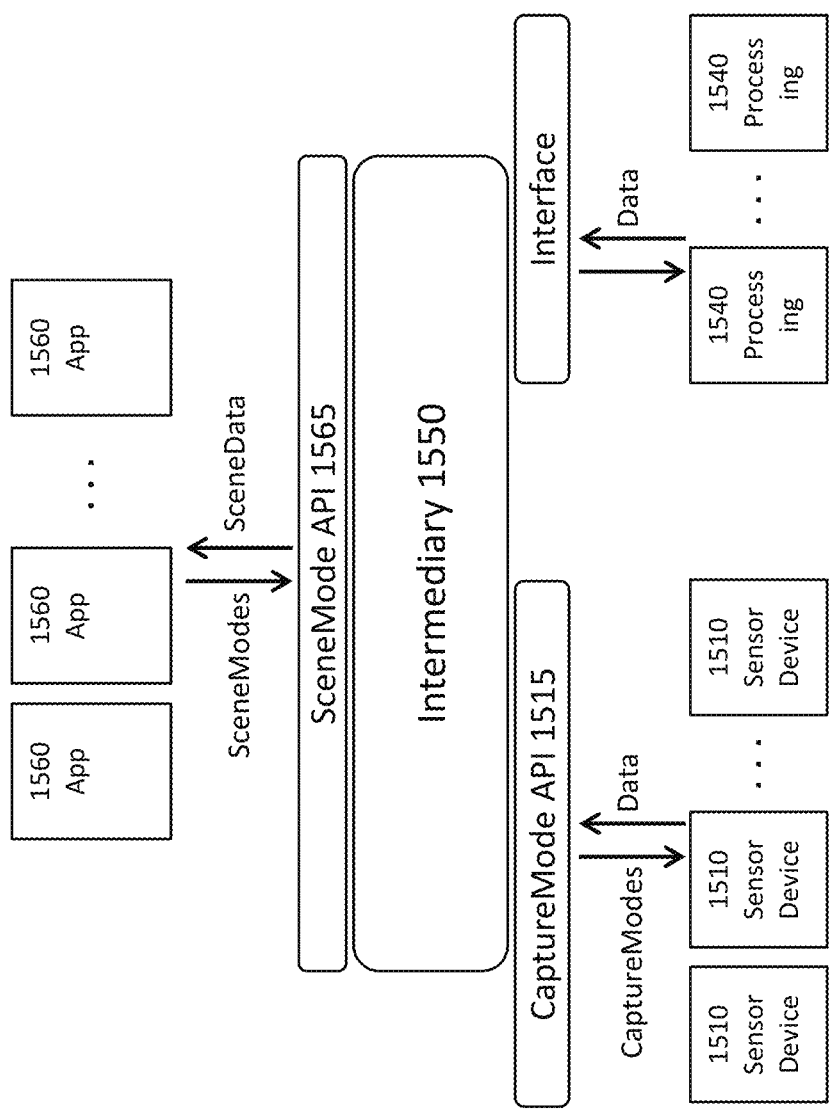
FIG. 15 is a block diagram of a third party providing intermediation services.

FIG. 15 is a block diagram in which a third party 1550 provides intermediation services between applications 1560 requesting SceneData and sensor networks 1510 capable of capturing the sensor data requested. The overall ecosystem may also include additional processing and analysis capability 1540, for example made available through cloud-based services. In one implementation, the intermediary 1550 is software that communicates with the other components over the Internet. It receives the requests for SceneData from the applications 1560 via a SceneMode API 1565. The requests are defined using SceneModes, so that the applications 1560 can operate at higher levels. The intermediary 1550 fulfills the requests using different sensor devices 1510 and other processing units 1540. In this example, the intermediary 1550 interfaces with the sensor devices 1510 using a CaptureMode API 1515, where the sensor devices are configured according to CaptureModes transmitted to them over the API 1515.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A system for multiple applications to specify and obtain a higher level understanding of scenes based on sensor data captured by a group of one or more sensor devices, the system comprising:
   a plurality of applications;
   a sensor-side technology stack comprising a group of one or more sensor devices that capture sensor data and processor capability for artificial intelligence and/or machine learning; and
   an application programming interface (API) for communication between any of the applications and the sensor-side technology stack;
   wherein the applications communicate SceneModes to the sensor-side technology stack via the API; and for each application:
      the SceneMode defines SceneData that is related to the scene of interest for that application and that is to be generated by the sensor-side technology stack;
      the SceneData is produced by the sensor-side technology stack based on a workflow for a capture, processing and analysis of sensor data, the SceneData including image data and also including data produced by artificial intelligence and/or machine learning applied to the image data; and
      the SceneMode does not specify a particular workflow for producing the SceneData, including not specifying sensor-level settings for the capture of the sensor data used to produce the SceneData; and
      the sensor-side technology stack determines, based on the SceneMode, the workflow for producing the SceneData, the workflow including sensor-level settings for the sensor devices that capture the sensor data from the scene used to produce the SceneData; and
      the SceneData is returned to the application via the API, the returned SceneData organized into SceneShots that are samples of the scene.

2. The system of claim 1 wherein the API, the SceneMode and a data structure for the SceneData are defined in one or more standard(s).

3. The system of claim 2 wherein the standard(s) define multiple predefined SceneModes.

4. The system of claim 3 wherein the predefined SceneModes include at least one of a Home Surveillance, Baby Monitoring, and Large Area Surveillance SceneModes.

5. The system of claim 2 wherein the standard(s) support user-defined SceneModes.

6. The system of claim 1 wherein the SceneMode provides context for the scene of interest.

7. The system of claim 1 wherein the artificial intelligence and/or machine learning is used in the workflow to derive events from the sensor data.

8. The system of claim 1 wherein the processor capability for the artificial intelligence and/or machine learning is located outside the sensor devices.

9. The system of claim 1 wherein the processor capability for the artificial intelligence and/or machine learning is located in the cloud.

10. The system of claim 1 wherein the workflow for the artificial intelligence and/or machine learning does not occur in real-time with respect to capture of the sensor data.

11. The system of claim 1 wherein the artificial intelligence and/or machine learning is used in the workflow for object recognition.

12. The system of claim 1 wherein the artificial intelligence and/or machine learning is used in the workflow for recognition of humans.

13. The system of claim 1 wherein the artificial intelligence and/or machine learning is used in the workflow for face recognition.

14. The system of claim 1 wherein the artificial intelligence and/or machine learning is used in the workflow for emotion recognition.

15. The system of claim 1 wherein the artificial intelligence and/or machine learning is used in the workflow for gesture recognition.

16. The system of claim 1 wherein the SceneMode defines the SceneData to include at least one of object recognition, recognition of humans, face recognition and emotion recognition.

17. A computer-implemented method for an application to specify and obtain a higher level understanding of a scene, the method comprising:
   communicating a SceneMode from an application to a sensor-side technology stack via an application programming interface (API), the sensor-side technology stack comprising a group of one or more sensor devices and processor capability for artificial intelligence and/or machine learning, wherein:
      the SceneMode defines SceneData that is related to the scene and that is to be returned to the application;
      the SceneData is produced by the sensor-side technology stack based on a workflow for a capture, processing and analysis of sensor data, the SceneData including image data and also including data produced by artificial intelligence and/or machine learning applied to the image data; and
      the SceneMode does not specify a particular workflow for producing the SceneData, including not specifying sensor-level settings for the capture of the sensor data used to produce the SceneData; and
   receiving the SceneData from the sensor-side technology stack via the API, wherein:
      the sensor-side technology stack determines, based on the SceneMode, the workflow for producing the SceneData, the workflow including sensor-level settings for sensor devices that capture the sensor data from the scene used to produce the SceneData; and
      the SceneData is organized into SceneShots that are samples of the scene.

18. The computer-implemented method of claim 17 wherein the API, the SceneMode and a data structure for the SceneData are defined in one or more standard(s).

19. A non-transitory computer-readable storage medium storing executable computer program instructions for an application to specify and obtain a higher level understanding of a scene, the instructions executable by a computer system and causing the computer system to perform a method comprising:
   communicating a SceneMode from an application to a sensor-side technology stack via an application programming interface (API), the sensor-side technology stack comprising a group of one or more sensor devices and processor capability for artificial intelligence and/or machine learning, wherein:
      the SceneMode defines SceneData that is related to the scene and that is to be returned to the application;

the SceneData is produced by the sensor-side technology stack based on a workflow for a capture, processing and analysis of sensor data, the SceneData including image data and also including data produced by artificial intelligence and/or machine learning applied to the image data; and the SceneMode does not specify a particular workflow for producing the SceneData, including not specifying sensor-level settings for the capture of the sensor data used to produce the SceneData; and receiving the SceneData from the sensor-side technology stack via the API, wherein:

the sensor-side technology stack determines, based on the SceneMode, the workflow for producing the SceneData, the workflow including sensor-level settings for sensor devices that capture the sensor data from the scene used to produce the SceneData; and the SceneData is organized into SceneShots that are samples of the scene.

20. The non-transitory computer-readable storage medium of claim 19 wherein the API, the SceneMode and a data structure for the SceneData are defined in one or more standard(s).

* * * * *